United States Patent
Cote et al.

(10) Patent No.: US 9,351,003 B2
(45) Date of Patent: May 24, 2016

(54) CONTEXT RE-MAPPING IN CABAC ENCODER

(71) Applicant: Apple Inc., Cupertino, CA (US)

(72) Inventors: Guy Cote, San Jose, CA (US); Weichun Ku, San Jose, CA (US); Jim C. Chou, San Jose, CA (US)

(73) Assignee: Apple Inc., Reno, NV (US)

( * ) Notice: Subject to any disclaimer, the term of this patent is extended or adjusted under 35 U.S.C. 154(b) by 420 days.

(21) Appl. No.: 14/039,900

(22) Filed: Sep. 27, 2013

(65) Prior Publication Data

US 2015/0092834 A1    Apr. 2, 2015

(51) Int. Cl.

| | | |
|---|---|---|
| H04N 19/13 | (2014.01) | |
| H04N 19/176 | (2014.01) | |
| H04N 19/423 | (2014.01) | |
| H04N 19/70 | (2014.01) | |
| H04N 19/129 | (2014.01) | |
| H04N 19/463 | (2014.01) | |
| H04N 19/436 | (2014.01) | |
| H04N 19/40 | (2014.01) | |

(52) U.S. Cl.
CPC ............. *H04N 19/13* (2014.11); *H04N 19/129* (2014.11); *H04N 19/176* (2014.11); *H04N 19/40* (2014.11); *H04N 19/436* (2014.11); *H04N 19/463* (2014.11); *H04N 19/70* (2014.11); *H04N 19/423* (2014.11)

(58) Field of Classification Search
CPC ...................................................... H04N 19/70
See application file for complete search history.

(56) References Cited

U.S. PATENT DOCUMENTS

| 7,932,843 B2 * | 4/2011 | Demircin et al. ... H03M 7/4006 |
| | | 341/107 |
| 7,961,122 B1 | 6/2011 | Lin |
| 2010/0040136 A1 * | 2/2010 | Sabo .................... H03M 7/4006 |
| | | 375/240.02 |
| 2010/0284456 A1 * | 11/2010 | Frank ..................... H04N 19/13 |
| | | 375/240.02 |
| 2012/0230417 A1 | 9/2012 | Sole Rojals et al. |
| 2012/0299757 A1 | 11/2012 | Xu |
| 2013/0177069 A1 | 7/2013 | Sze et al. |

FOREIGN PATENT DOCUMENTS

WO        2013017092        2/2013

OTHER PUBLICATIONS

U.S. Appl. No. 14/039,880, filed Sep. 27, 2013, Weichun Ku, et al.

* cited by examiner

*Primary Examiner* — Andy Rao
*Assistant Examiner* — Tyler Edwards
(74) *Attorney, Agent, or Firm* — Robert C. Kowert; Meyertons, Hood, Kivlin, Kowert & Goetzel, P.C.

(57) ABSTRACT

A video encoder may include a context-adaptive binary arithmetic coding (CABAC) encode component that converts each syntax element of a representation of a block of pixels to binary code, serializes it, and codes it mathematically, after which the resulting bit stream is output. A lookup table in memory and a context cache may store probability values for supported contexts, which may be retrieved from the table or cache for use in coding syntax elements. Depending on the results of a syntax element coding, the probability value for its context may be modified (e.g., increased or decreased) in the cache and, subsequently, in the table. After coding multiple syntax elements, and based on observed access patterns for probability values, a mapping or indexing for the cache or the table may be modified to improve cache performance (e.g., to reduce cache misses or access data for related contexts using fewer accesses).

20 Claims, 18 Drawing Sheets

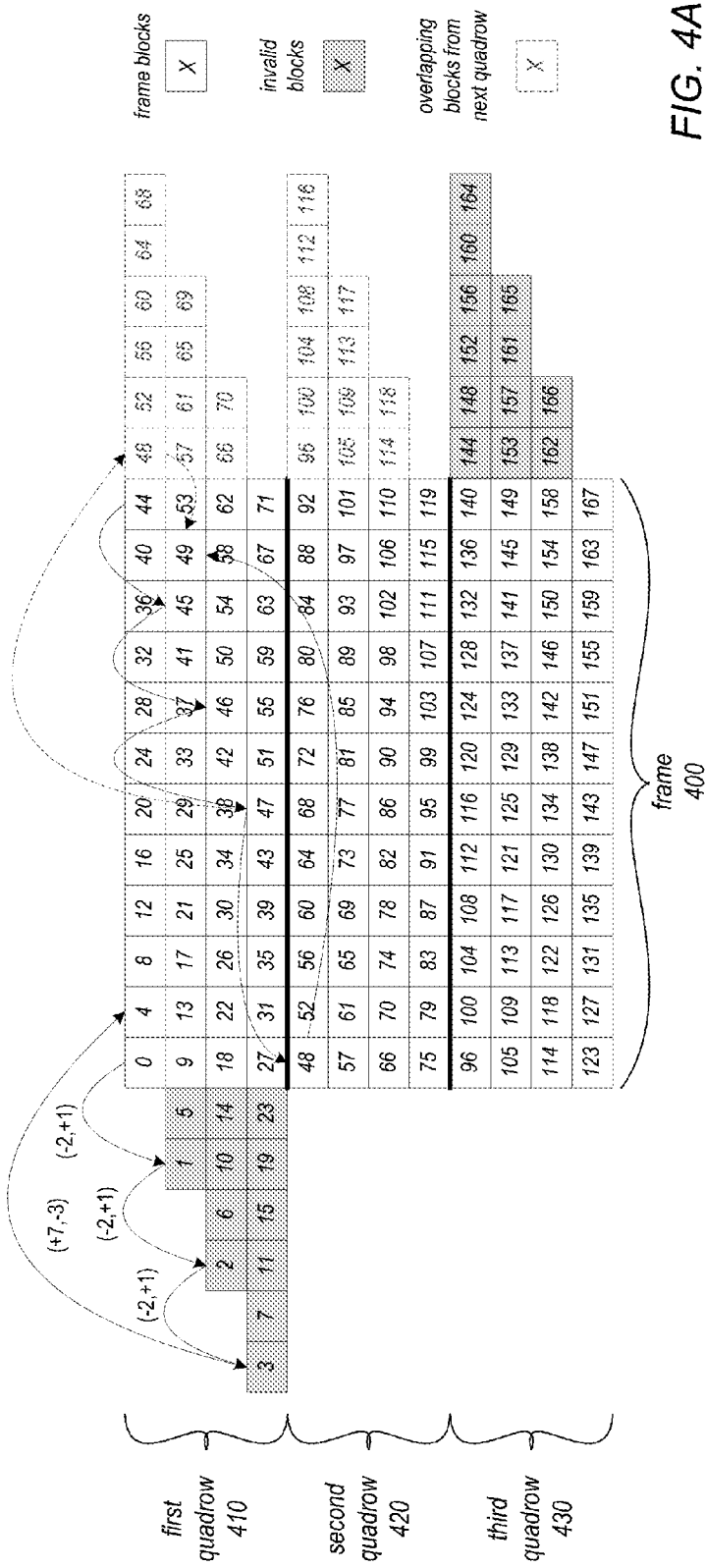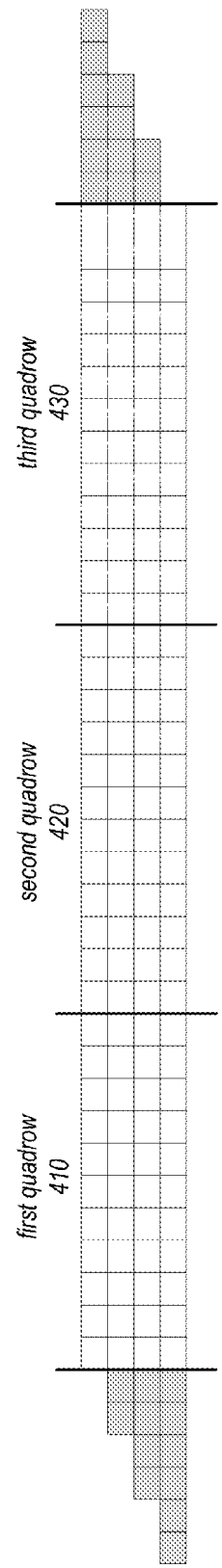
FIG. 4A
FIG. 4B

US 9,351,003 B2

CONTEXT RE-MAPPING IN CABAC ENCODER

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation. The H.264 recommendation includes a definition for context-adaptive binary arithmetic coding (CABAC) entropy encoding.

Generally, context-adaptive coding components must read from and write to a context lookup table, which is typically implemented in external memory. The context lookup table is sometimes implemented as a dual-port memory (including a read port and a separate write port) to increase performance, but this approach can be prohibitively expensive.

SUMMARY OF EMBODIMENTS

Embodiments of block processing methods and apparatus are described in which a block processing pipeline includes multiple pipeline components, each of which performs one or more operations on a block of pixels from a video frame (or a representation thereof). In a context-adaptive binary arithmetic coding (CABAC) encode component of such a video encoding pipeline, each syntax element of a representation of a block of pixels may be converted to binary code, serialized, and then coded mathematically with its corresponding probability model (based on its context), after which the resulting bit stream may be output. In at least some embodiments, each bit in the bit stream may have one of two possible values (symbols).

In some embodiments of the video encoders described herein, each syntax element may be coded based, at least in part, on a probability value for its context. For example, a lookup table in a relatively slow memory may store a context model (which may include probability values for each supported context). In some embodiments, the block processing pipeline may include a context cache (or a local buffer or collection of registers that exhibits at least some of the characteristics of a cache) that stores probability values for at least some of the supported contexts (e.g., frequently and/or recently accessed probability values). For a given syntax element, the CABAC encode component may determine a context (e.g., based in the given syntax element, neighbor information, and/or control information inputs), obtain a probability value for the context from the lookup table in memory or from the context cache, and code the syntax element based on the obtained probability value. Depending on the results of the coding, the probability value for the context may be updated (e.g., increased or decreased). For example, an updated probability value for the context may be stored in the cache, from which it may be accessed for use in another coding operation. Subsequently, the updated probability value may be updated in the lookup table.

In some embodiments, in response to coding multiple syntax elements, monitoring accesses to probability values and/or detecting patterns in those accesses that suggest that there would be benefit in making a particular change to the cache mapping or indexing, an indexing scheme for the lookup table and/or the context cache, or one or more mappings between the supported contexts (e.g., their indexes), the context cache and/or the lookup table stored in memory may be modified in an attempt to optimize the cache performance (and, thus, improve the throughput of the CABAC encode component). In other words, based on observed access patterns for the context information, modifications may be made that may reduce cache misses and/or may allow probability values for related contexts to be retrieved from the lookup table and/or the context cache using fewer access operations. In some embodiments, the locations at which the probability values for particular contexts are stored in the cache and/or the indexing of the cache locations may be modified based on observed access patterns for the context information.

In one example, based on the content of an input video stream and/or high level syntax elements (e.g., those that contain control information for the block processing pipeline), different context address mappings may be defined and implemented such that context model state (e.g., probability values) for contexts that are accessed sequentially may be stored in sequential locations in memory. In some embodiments, a programmable re-mapping table may allow software to optimize lookup table and/or context cache access patterns based on the content of the input video stream. In some embodiments, statistics about context cache miss rates and/or hit rates may be tracked and used to determine the best mapping.

BRIEF DESCRIPTION OF THE DRAWINGS

FIGS. 4A and 4B graphically illustrate the knight's order processing method including the algorithm for determining a next block, according to at least some embodiments.

Figure 1:
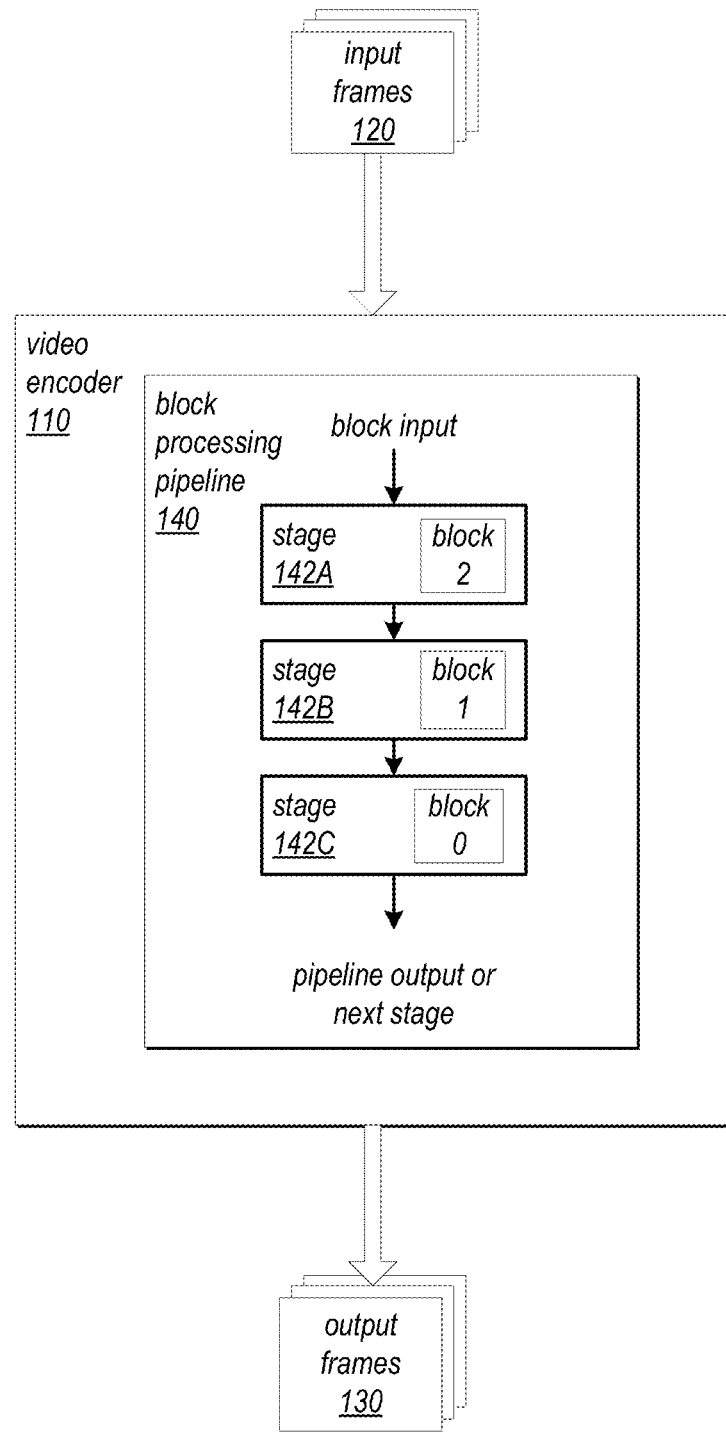
FIG. 1 illustrates an example video encoder including a conventional block processing pipeline that processes blocks from input frames in scan order.
Figure 2:
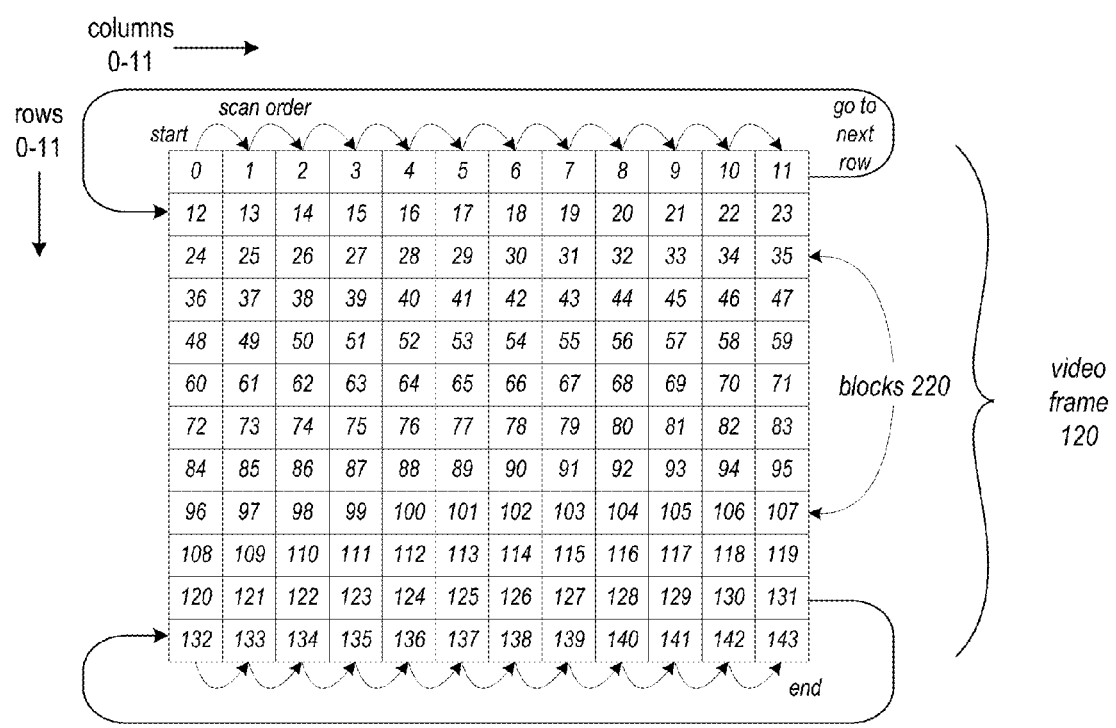
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 10:
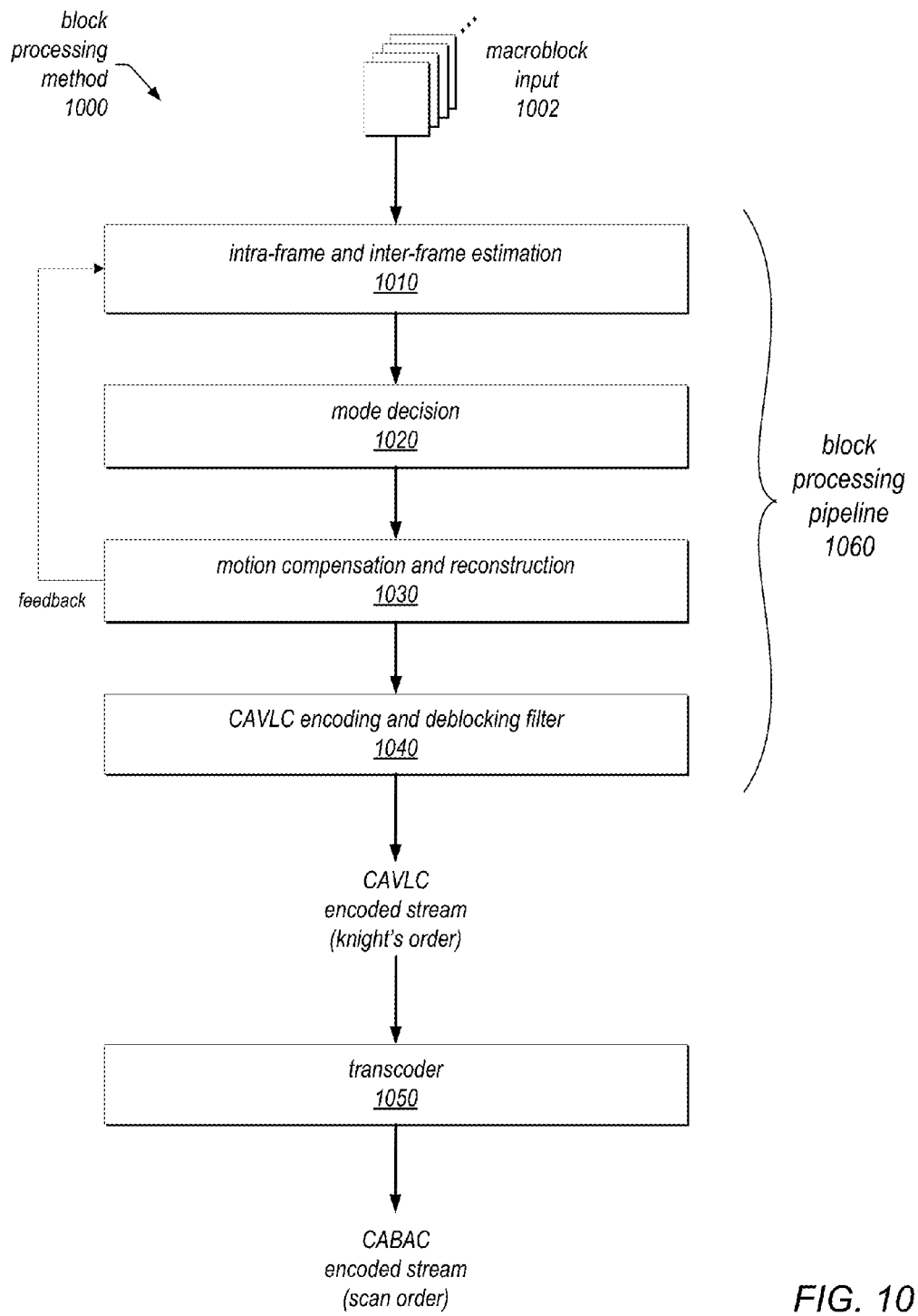
FIG. 10 is a high-level block diagram of general operations in an example block processing method that may be implemented by a block processing pipeline that implements one or more of the block processing methods and apparatus described herein, according to at least some embodiments.
Figure 17:
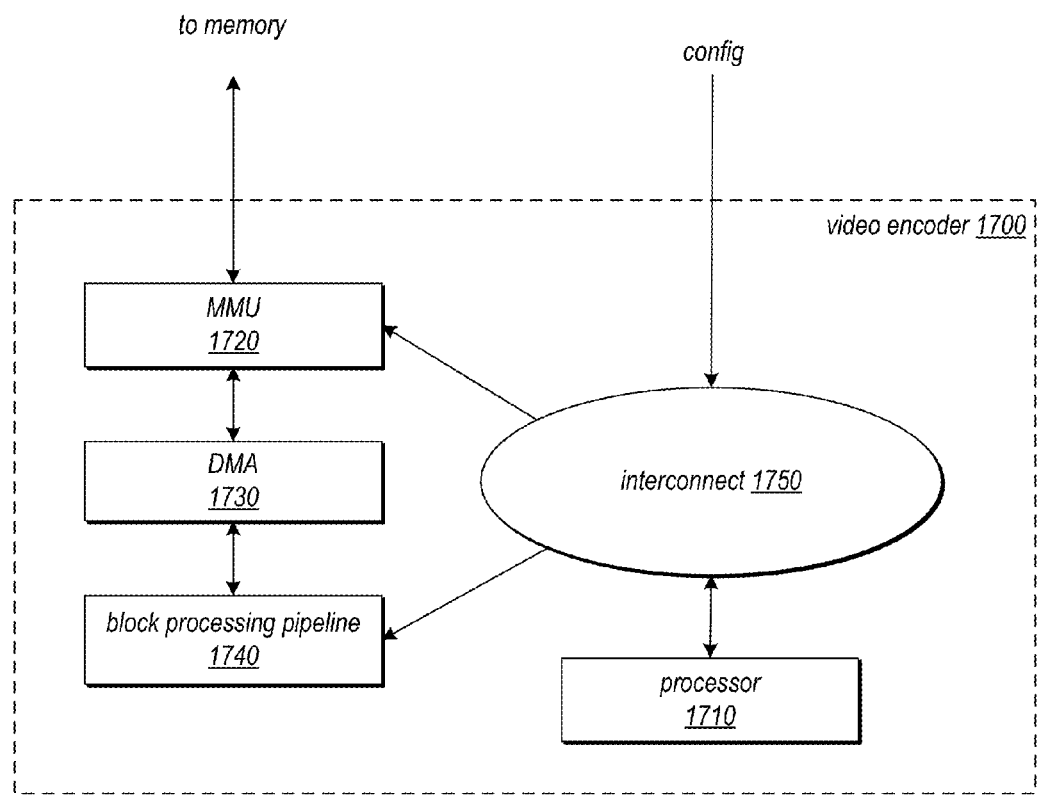
FIG. 17 is a block diagram illustrating an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 10 illustrates an example block processing pipeline of an example H.264 video encoder, and FIG. 17 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 3:
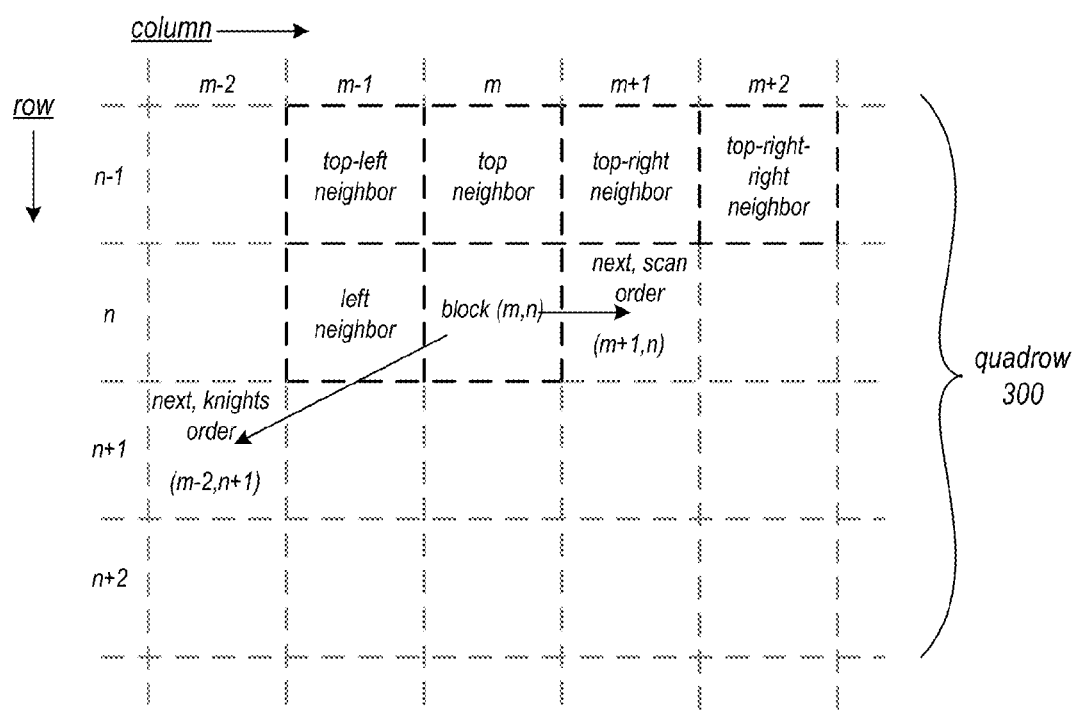
FIG. 3 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 3 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 3, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 3 and quadrow 300, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 3. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 4A and 4B graphically illustrate the knight's order processing method, according to at least some embodiments. For simplicity, these FIGS. use an example 192×192 pixel frame 400 divided into 144 16×16 pixel blocks, with 12 rows and 12 columns of blocks. However, it is to be noted that the knight's order processing method can be applied to input video frames of any dimensions. In FIG. 4A, an example frame is divided into rows and columns of blocks. The rows of blocks are partitioned into three quadrows (410, 420, and 430) including four rows each. The last three rows of the first quadrow (410) are padded on the left with invalid blocks, and the first three rows of the last (third) quadrow (430) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 4A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 4A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 410, 420, and 430 as if they were arranged end to end, with invalid blocks at each end, as shown in FIG. 4B. Thus, the algorithm for determining a next block remains the same across the entire frame 400.

In some embodiments, each row of the first quadrow may be padded with extra invalid blocks, for example with two extra invalid blocks. Instead of beginning with the first block in the top row of the first quadrow as shown in FIG. 4A, input to the pipeline may begin with the first invalid block to the left of the first block in top row of the first quadrow.

Figure 5A:
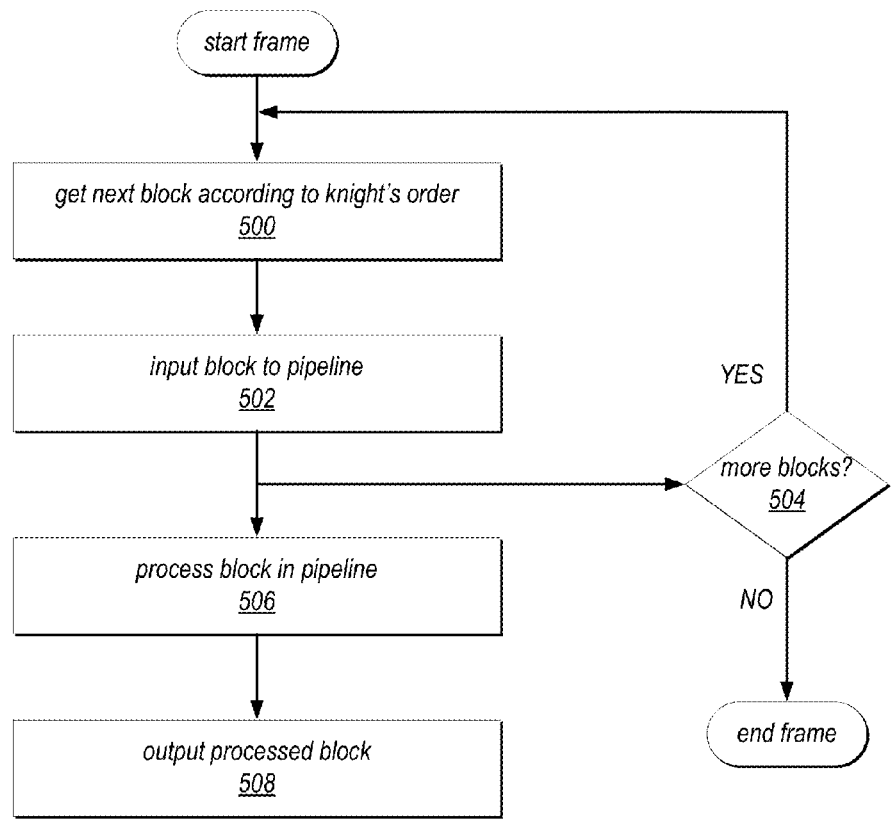
FIGS. 5A and 5B are high-level flowcharts of a knight's order processing method for a block processing pipeline, according to at least some embodiments.
Figure 5B:
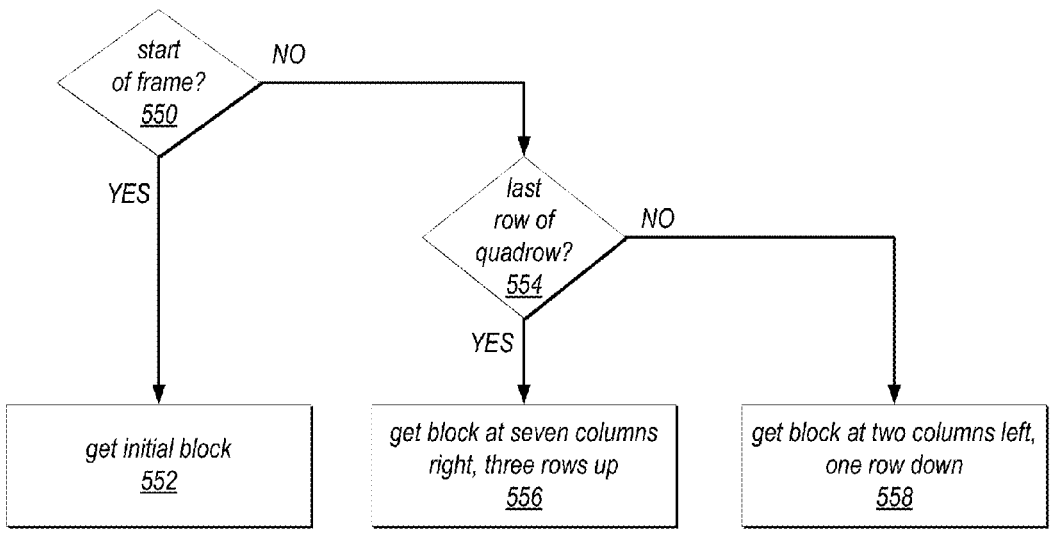

FIGS. 5A and 5B are high-level flowcharts of a knight's order processing method for a block processing pipeline, according to at least some embodiments. In FIG. 5A, as indicated at 500, a next block is determined according to the algorithm for determining a next input block that is implemented by the knight's order processing method. As indicated at 502, the block is input to the pipeline, for example from a memory via direct memory access (DMA). As shown by 504, the input process of elements 500 and 502 continues as long as there are blocks to be processed. Each block that is input to the pipeline by elements 500 and 502 is processed in the pipeline, as indicated at 506. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 508, once a block has been processed by a last stage of the pipeline, the processed block is output, for example to a memory via direct memory access (DMA).

FIG. 5B is a flowchart of an example algorithm for determining a next input block that that may be implemented by the knight's order processing method, and expands on element 500 of FIG. 5A. FIG. 5B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 550, if at the start of the frame, the method gets an initial block as indicated at 552. If this is not the start of the frame, then at 554, if this is the last row of the quadrow, the next block is seven columns right, three rows up, as indicated at 556. If this is not the last row of the quadrow, the next block is two columns left, one row down, as indicated at 558.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 6:
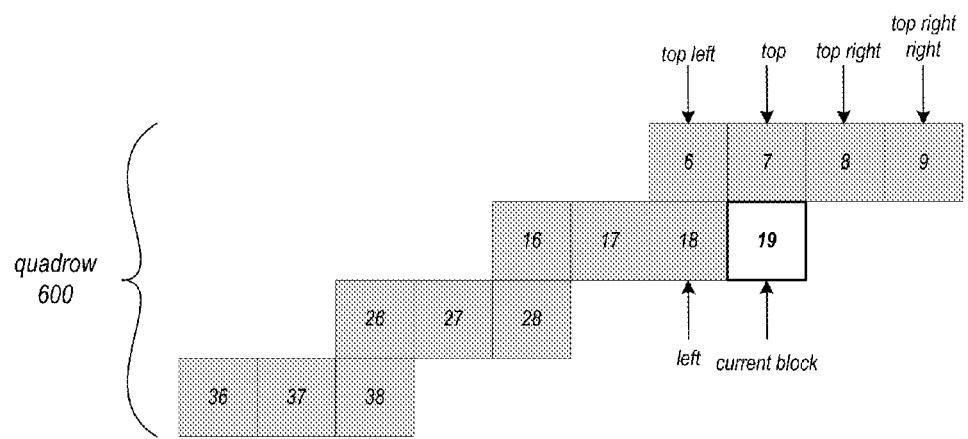
FIG. 6 illustrates a portion of a quadrow as processed in a pipeline according to the knight's order processing method that may be cached in the current quadrow buffer, according to at least some embodiments FIG. 7 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 6 shows a portion of a quadrow 600 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 7:
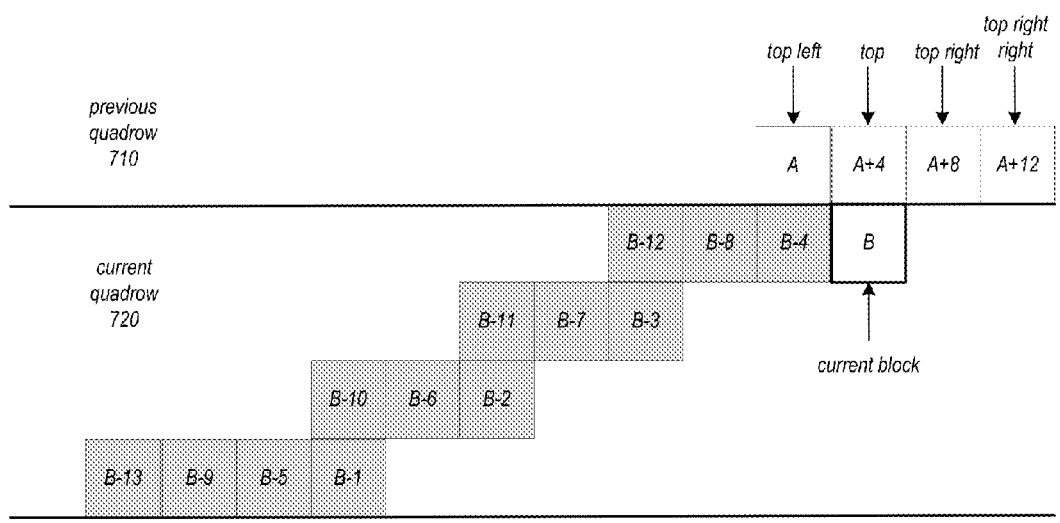

FIG. 7 graphically illustrates blocks in a current quadrow 720 being processed according to the knight's order processing method, as well as neighbor blocks in the last row of the previous quadrow 710, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 8:
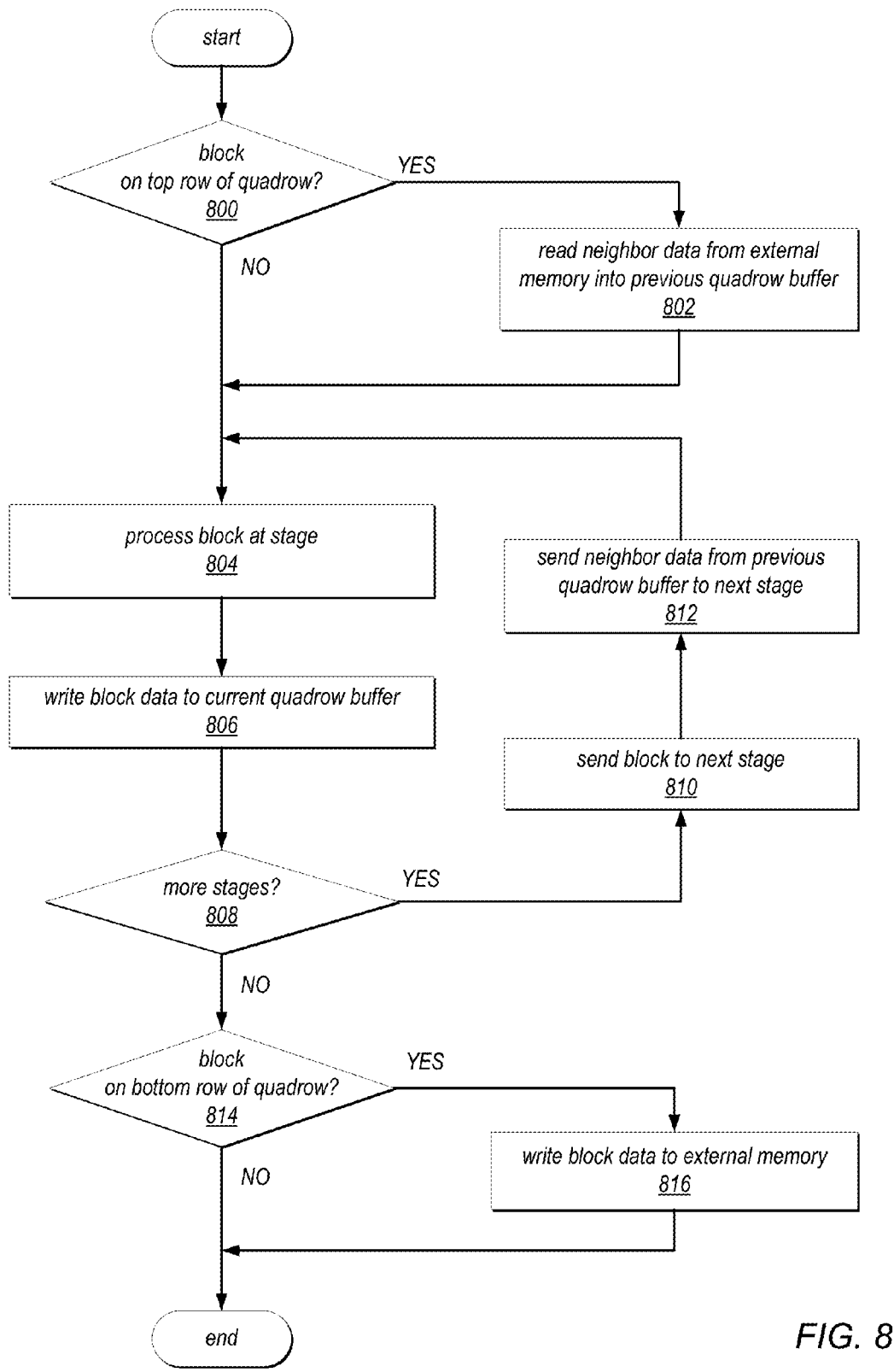
FIG. 8 is a flow diagram illustrating a method for processing blocks in a block processing pipeline in which neighbor data is cached in local buffers at the stages of the pipeline, according to at least some embodiments.

FIG. 8 is a flow diagram illustrating a method for processing blocks in a block processing pipeline in which neighbor data is cached in local buffers at the stages of the pipeline, according to at least some embodiments. For example, the method of FIG. 8 may be used at element 506 of FIG. 5A to process blocks input to the pipeline according to the knight's order processing method as shown at elements 500, 502, and 504 of FIG. 5A. In FIG. 8, a block is input to the pipeline. At 800, at a first stage of the pipeline, if the block is on the top row of a quadrow, then neighbor data for the block may be read from external memory (for example, via DMA) into a previous quadrow buffer as indicated at 802. In at least some embodiments, the neighbor data corresponds to the top-right-right neighbor of the current block on the bottom row of the previous quadrow. As indicated at 804, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 806, information about the current block may be written to the current quadrow buffer at the stage for use on subsequent blocks. The information may overwrite an oldest entry in the current quadrow buffer.

At 808, if there are more stages, then the block may be sent to a next stage, as indicated at 810. At 812, neighbor information from the previous quadrow buffer may also be sent to the next stage. In at least some embodiments, this neighbor information is only sent to the next stage if the current block is on the top row of a quadrow. Elements 804 through 812 may be repeated until the block reaches and is processed by a last stage of the pipeline. At 808, if there are no more stages, then processing of the block in the pipeline is done. At 814, if the block is on the bottom row of a quadrow, then information for the block is written to an external memory (for example, via DMA) to be read as neighbor data for blocks in the top row of a next quadrow. In addition, all of the processed valid blocks are output as shown by element 508 of FIG. 5A.

Example Pipeline Units

Figure 9A:
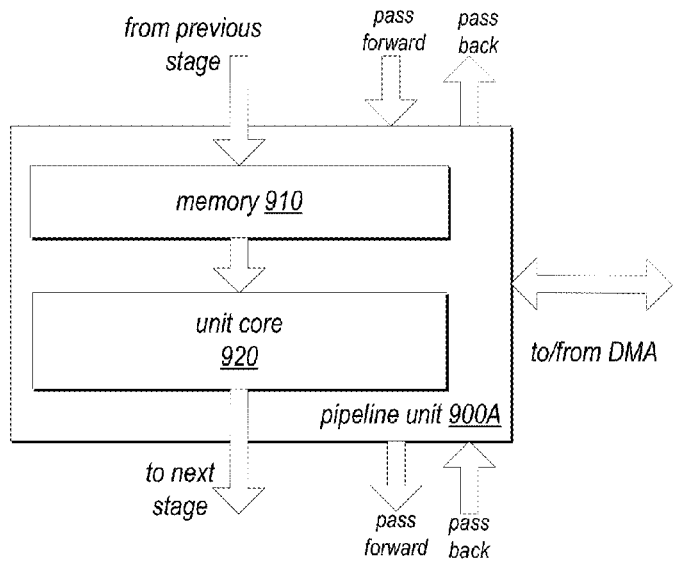
FIGS. 9A and 9B are block diagrams of example pipeline processing units that may be used at the stages of a block processing pipeline that implements one or more of the block processing methods and apparatus as described herein, according to at least some embodiments.
Figure 9B:
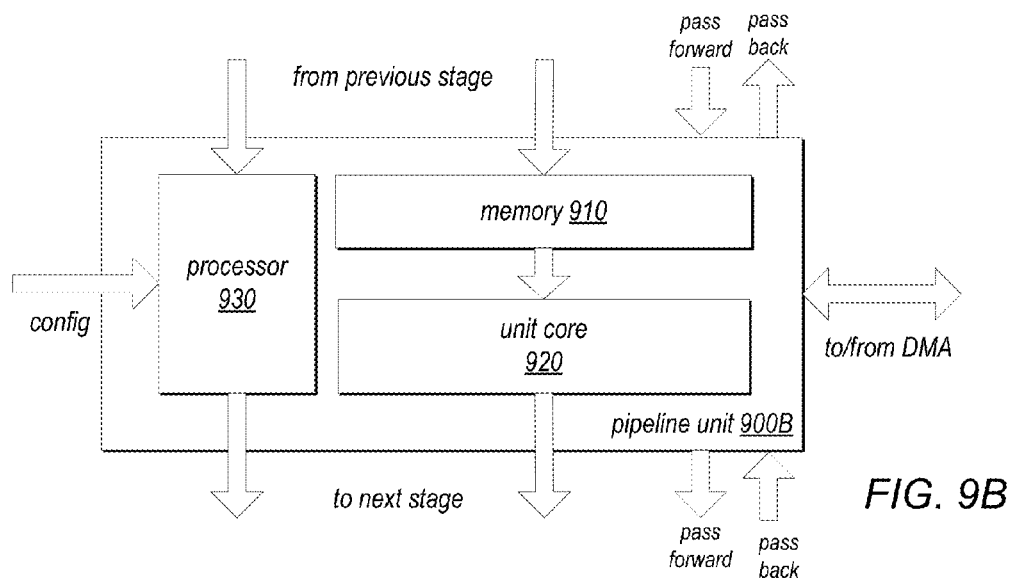
Figure 9C:
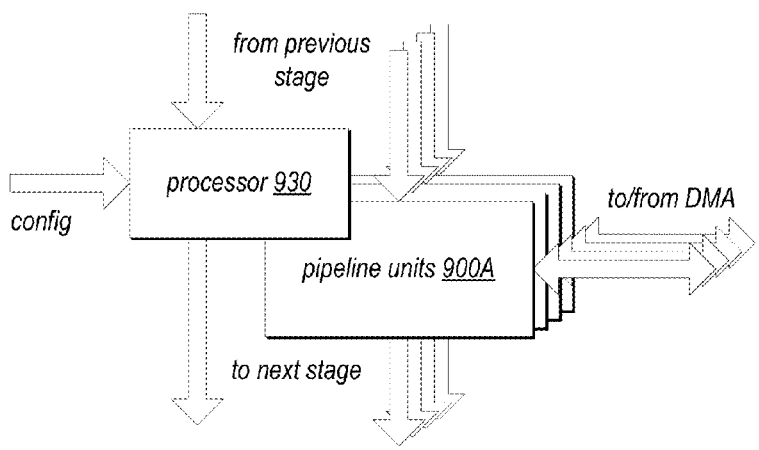
FIG. 9C illustrates that a single processor may be associated with a group of two or more pipeline units, according to at least some embodiments.

FIGS. 9A through 9C are block diagrams of example pipeline processing units that may be used at the stages of a block processing pipeline that implements one or more of the block processing methods and apparatus as described herein, according to at least some embodiments. For example, one or more of pipeline units 900A and/or 900B as shown in FIGS. 9A and 9B may be used at each stage of the example block processing pipeline shown in FIG. 10. Note that FIGS. 9A through 9C are not intended to be limiting; a pipeline processing unit may include more or fewer components and features than those shown in the FIGS.

As shown in FIG. 9A, a pipeline unit 900A may include at least a memory 910 and a unit core 920. Unit core 920 may be a component (e.g., a circuit) that is configured to perform a particular operation on or for a block, or a portion of a block, at a particular stage of the block processing pipeline. Memory 910 may, for example, be a double-buffered memory that allows the unit core 920 to read and process data for a block from the memory 910 while data for a next block is being written to the memory 910 from a previous pipeline unit.

As shown in FIG. 9B, a pipeline unit 900B, in addition to a memory 910 and unit core 920 as shown in FIG. 9A, may also include a processor 930. Processor 930 may, for example, be a mobile or M-class processor. The processors 930 in pipeline units 900B of a block processing pipeline may, for example, be used to control the block processing pipeline at block boundaries. The processors 930 in pipeline units 900B may be configurable, for example with low-level firmware microcode, to allow flexibility in algorithms that are implemented by the block processing pipeline for various applications. In at least some embodiments, a processor 930 of a pipeline unit 900B in the pipeline may be configured to receive data from a processor 930 of a previous (upstream) pipeline unit 900B and send data to a processor 930 of a subsequent (downstream) pipeline unit 900B. In addition, a processor 930 of a pipeline unit 900B at a last stage of the pipeline may be configured to send feedback data to a processor 930 of a pipeline unit 900B at a first stage of the pipeline.

As shown in FIGS. 9A and 9B, a pipeline unit 900A or 900B may be configured to access external memory, for example according to direct memory access (DMA). In addition, a pipeline unit 900A or 900B may be configured to pass information back to one or more previous (upstream) stages of the pipeline and/or to receive information passed back from one or more subsequent (downstream) stages of the pipeline. In addition, a pipeline unit 900A or 900B may be configured to pass information forward to one or more subsequent (downstream) stages of the pipeline and/or to receive information passed forward from one or more previous (upstream) stages of the pipeline.

As shown in FIG. 9C, two or more units 900A as shown in FIG. 9A may be grouped together and configured to perform an operation in the pipeline. A single processor 930 may be used to control and/or configure the pipeline units 900A.

Example Block Processing Pipeline

FIG. 10 is a high-level block diagram of general operations in an example block processing method 1000 for H.264 encoding that may be implemented in stages by a block processing pipeline that may implement one or more of the block processing methods and apparatus as described herein, according to at least some embodiments. A block processing pipeline that implements the block processing method 1000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

Figure 18:
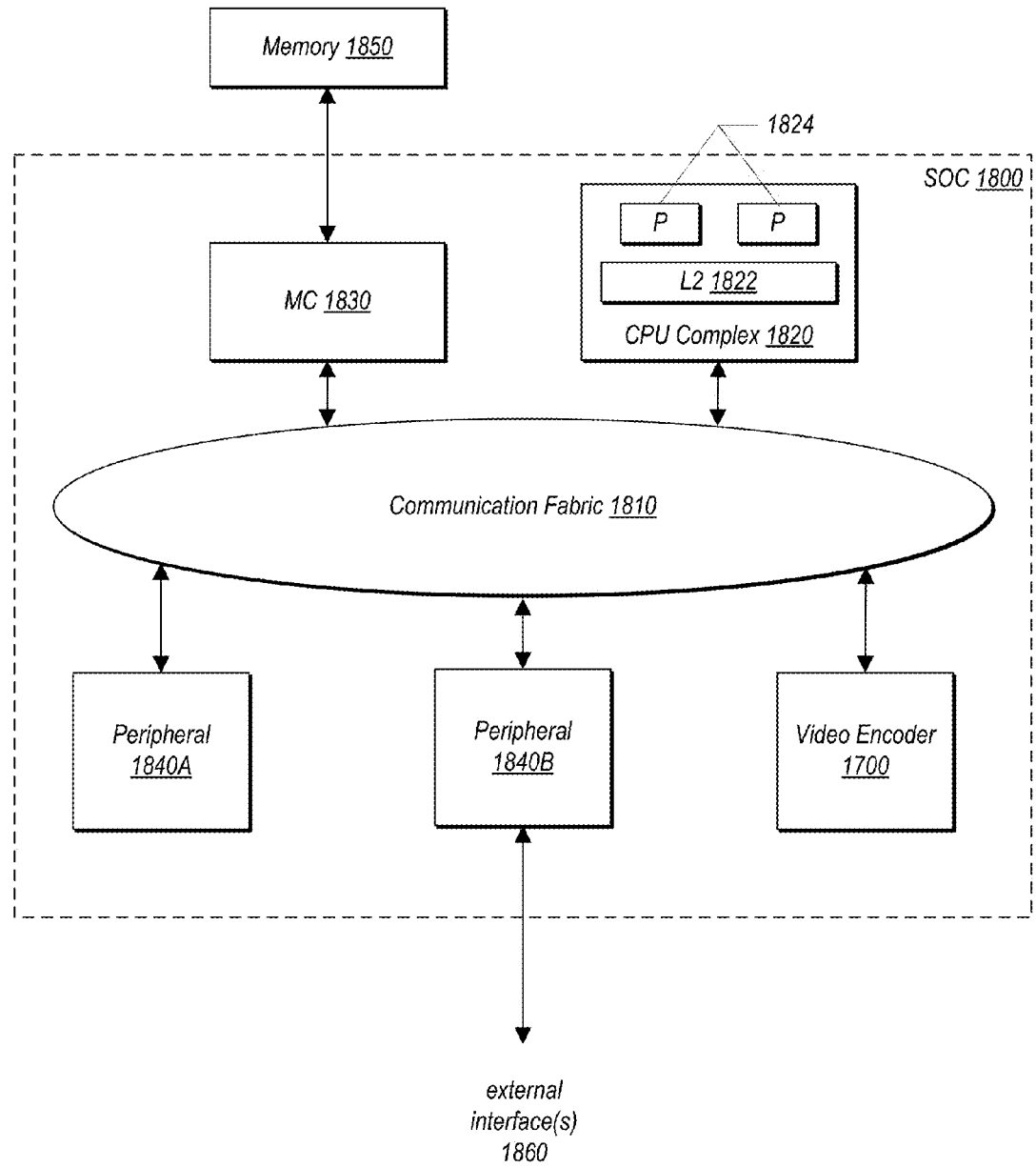
FIG. 18 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 10, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 17. An example SOC that includes a video encoder apparatus is illustrated in FIG. 18. While embodiments are generally described in relation to hardware implementations of a block processing pipeline that implements the block processing method 1000 with knight's order processing, note that the block processing method 1000 with knight's order processing may be implemented by a block processing pipeline implemented in software.

A pipeline that implements the method 1000 as shown in FIG. 10 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1000 as shown in FIG. 10 that may be performed in stages by a pipeline, as well as general data flow through the pipeline, are briefly described below. Each of the general operations of the method 1000 may be implemented by one or more pipeline units at one or more stages of the pipeline. Example pipeline units are illustrated in FIGS. 9A through 9C. Also note that each general operation shown in FIG. 10 may be subdivided into two or more operations that may be implemented by pipeline units at one, two, or more stages of the pipeline. However, two or more of the operations shown in FIG. 10 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 10 and described below.

Macroblock Input

In at least some embodiments, macroblock input 1002 may be performed by an initial stage of the pipeline. In at least some embodiments, macroblock input 1002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's Order Processing.

In at least some embodiments, macroblock input 1002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 1010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1010 operations may be subdivided into two or more sub-operations that may be performed at one, two, or more stages of the pipeline, with one or more components or pipeline units at each stage configured to perform a particular sub-operation.

In at least some embodiments, macroblock input 1002 reads neighbor data from the bottom row of a previous quadrow from memory at quadrow boundaries and passes the neighbor data to intra-frame and inter-frame estimation 1010, for example to an intra-frame estimation component. In addition, motion compensation and reconstruction 1030, for example a luma reconstruction component, may pass neighbor data as feedback to intra-frame and inter-frame estimation 1010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1020.

In at least some embodiments, motion estimation may also include a direct mode estimation component that receives co-located and spatial motion vector data and computes a direct/skip mode cost, which it provides to mode decision 1020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1020.

In at least some embodiments, macroblock input 1002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1020 may be implemented by a mode decision component at a stage of the pipeline that is downstream of the stage(s) that implement intra-frame and inter-frame estimation 1010 operations. However, in some embodiments, mode decision 1020 operations may be subdivided into two or more sub-operations that may be performed at one, two, or more stages of the pipeline, with one or more components or pipeline units at each stage configured to perform a particular sub-operation. In at least some embodiments, the mode decision 1020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, subpartitions, prediction direction and reference frame indices. In at least some embodiments, the mode decision 1020 component also performs all motion vector prediction. The motion vector prediction results may be used when estimating motion vector rate during mode decision. In at least some embodiments, the motion vector prediction results may also be fed back from the mode decision 1020 component to motion estimation, for example for use in direct mode estimation and motion vector rate estimation.

Motion Compensation and Reconstruction

In at least some embodiments, motion compensation and reconstruction 1030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1030 may be subdivided into luma motion compensation and reconstruction and chroma motion compensation and reconstruction. In at least some embodiments, each of these sub-operations of motion compensation and reconstruction 1030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1010 as feedback for use as neighbor data when processing subsequent macroblocks. In at least some embodiments, reconstructed pixels may also be passed back to an intra prediction neighbor pixel memory at the stage for use as neighbor pixels when predicting subsequent blocks inside the current macroblock at the stage.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 1020 results. The chroma motion compensation component performs subpixel interpolation to generate a prediction block. Mode decision 1020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1010 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory. Note that in other embodiments, an encode component of the pipeline may generate an output stream other than a CAVLC encoded bit stream, for example an output stream in a proprietary format or in a format defined by another compression standard, such as the HEVC standard.

In at least some embodiments, the deblocking filter component and the CAVLC encode component write neighbor data for the bottom row of a quadrow to a memory at quadrow boundaries. Referring again to FIG. 10, for the top row of a next quadrow, macroblock input 1002 may then read this neighbor data from the memory at quadrow boundaries and pass the neighbor data to at least one downstream stage of the pipeline.

Transcoder

In at least some embodiments, a transcoding operation may be performed by a transcoder 1050. The transcoder may be implemented as a functional component of the pipeline or as a functional component that is external to the pipeline. In at least some embodiments, the transcoder 1050 may perform a memory-to-memory conversion of a CAVLC (context-adaptive variable-length coding) encoded stream output by the pipeline to a CABAC (context-adaptive binary arithmetic coding) encoded stream. Note that in other embodiments, the transcoder 1050 may perform a memory-to-memory conversion of data in a format other than a CAVLC encoded bit stream (e.g., data in a proprietary format or in a format defined by another compression standard, such as the HEVC standard) to a CABAC encoded bit stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1050 handles stitching the start and end of each row to generate a continuous stream at macroblock row boundaries. In at least some embodiments, the pipeline may embed metadata in the CAVLC output stream to facilitate stitching of the rows by the transcoder 1050.

Figure 11:
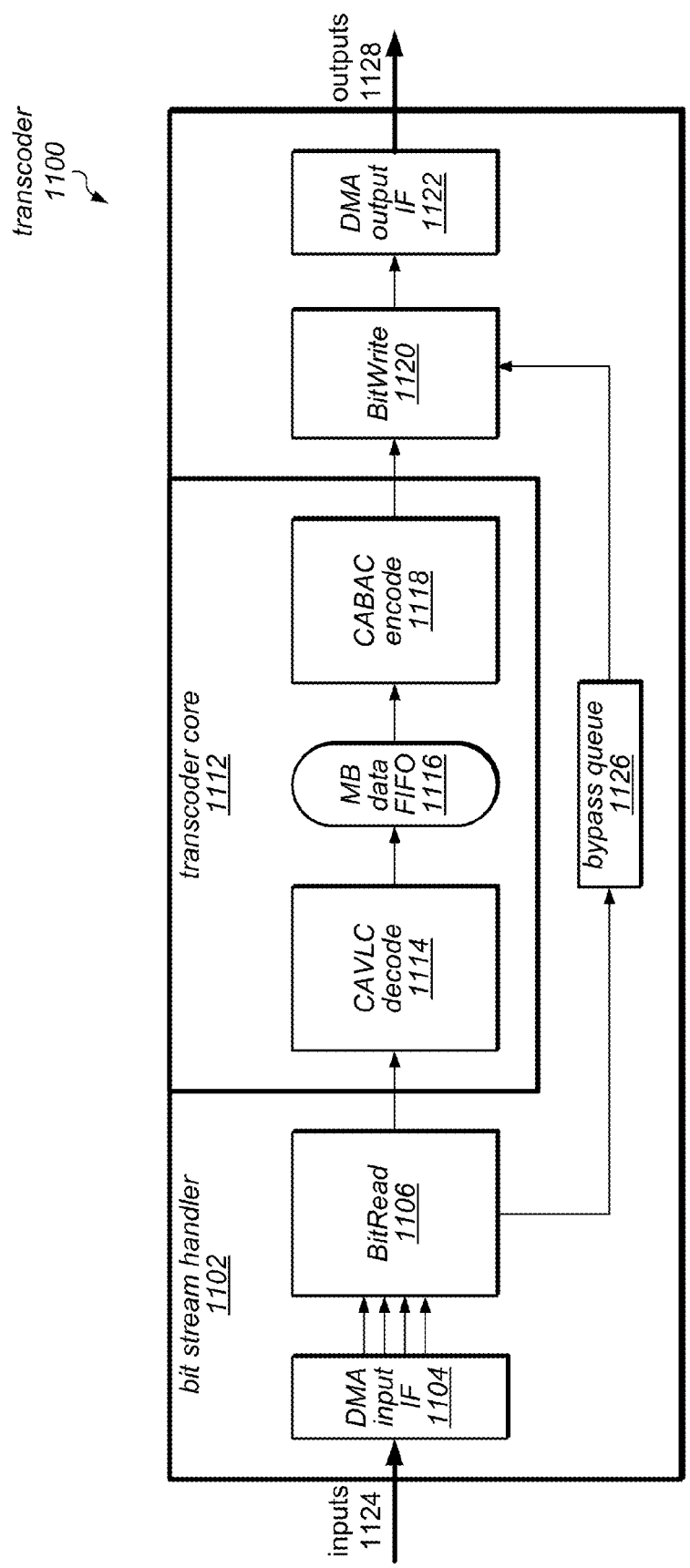
FIG. 11 is a block diagram illustrating one embodiment of a transcoder.

One embodiment of a transcode component (sometimes referred to as an entropy transcode block) is illustrated by the block diagram in FIG. 11. As illustrated in FIG. 11, the transcode component (shown as transcoder 1100) may include a bit stream handler 1102 (which may include a DMA input interface 1104, a bit reader component 1106, a bit writer component 1120, and a DMA output interface 1122), a transcoder core 1112 (which may include a CAVLC decode component 1114, a macroblock data FIFO 1116, and a CABAC encode component 1118), and a bypass queue 1126.

The inputs to transcoder 1100 (shown as inputs 1124) may include the CAVLC encoded bits for multiple macroblocks (which may be written to different channels of DMA input interface 1104), neighbor information (e.g., CAVLC encoded information representing neighbor data, received over one DMA channel), co-located data for use in direct mode estimation (e.g., received over one DMA channel), and/or firmware data (which may be received from a processor of the CAVLC component over one DMA channel), in various embodiments. In at least some embodiments, the outputs of transcoder 1100 (shown as outputs 1128) may include a single encoded bit stream (e.g., a CAVLC encoded bit stream or a CABAC encoded bit stream), as described herein.

In some embodiments, the DMA input interface of the transcode component may share a single data bus with four push/credit interfaces. In some such embodiments, the inputs to the bit reader component (shown as BitRead 1106) from DMA input interface 1104 may include a push input and data, and the outputs from BitRead 1106 back to DMA input interface 1104 may include a multiple-bit credit output. In such embodiments, the outputs from the bit writer component (shown as BitWrite 1120) to DMA output interface 1122 may include push and data outputs, and the inputs to BitWrite 1120 from DMA output interface 1122 may include the multiple-bit credit output from DMA output interface 1122. In the example transcode component illustrated in FIG. 11, bypass queue 1126 is illustrated as a component on the path within bit stream handler 1102 from the bit reader component (BitRead 1106) to the bit writer component (BitWrite 1120).

As described herein, if the desired output of the video encoding exercise is CAVLC encoded data for the blocks of a video frame, the operations of the transcoder core (such as transcoder core 1112) may be elided. In this case, the CAVLC encoded data may pass through a bypass queue (such as bypass queue 1126), rather than through the transcoder core. However, if the desired output of the video encoding exercise is CABAC encoded data, the transcode component (or, more specifically, the transcoder core 1112) may also be configured to convert the CAVLC encoded data to CABAC encoded data prior to writing the output bit stream to memory. In this case, the main block processing pipeline may be configured to begin processing another quadrow of blocks (e.g., performing CAVLC encoding of the blocks in knight's order and then writing them out to multiple DMA buffers) while the transcode component performs the operations to convert the CAVLC encoded data to CABAC encoded data.

Bit Stream Handler

As previously noted, the bit stream handler (such as bit stream handler 1102) of a transcode component (such as transcoder 1100) may merge CAVLC encoded data from four DMA buffers (which may be in external memory) into a single contiguous CAVLC bit stream, or into a transcoded CABAC stream, and may output the final bit stream to memory. For example, in CAVLC mode, the DMA buffers (sometimes referred to as CAVLC intermediate buffers) may be read in macroblock scan order and the bit streams read from these buffers may be written as a single contiguous bit stream to an output buffer. In CABAC mode, the DMA buffers (or CAVLC intermediate buffers) may be read in scan order and transcoded into a CABAC encoded bit stream, which may then be written in a continuous output buffer in memory.

Bit Reader

In some embodiments, a bit reader component of the bit stream handler (such as BitRead 1106) receives CAVLC encoded data from four DMA channels, reads bits from the channel corresponding to the current macroblock row, detects start codes or other synchronization information, and provides a contiguous bit stream to a CAVLC decode component (such as CAVLC decode 1114) or to a bypass queue (such as bypass queue 1126). The bit reader may also optionally remove start codes or other information from the input bit stream, in some embodiments.

Input DMA

As noted above, the transcoder DMA input interface (such as DMA input interface 1104) may share a single data bus with four push/credit interfaces. In some embodiments, each interface may independently control a single DMA buffer, but only one buffer can be written to at a time. Under the push/credit protocol, a credit may indicate a free entry within a buffer. In some embodiments, each buffer can be written to at any time, i.e., there may be no restriction on the order of the input data.

Output DMA

The transcoder DMA output interface (such as DMA output interface 1122) may also follow the push/credit protocol. Additionally, an idle signal may indicate to the write DMA engine that the transcode component has finished operating on the current block data, and it should flush any pending data to memory.

CAVLC Decode

In some embodiments, a CAVLC decode component (such as CAVLC decode 1114) may be configured to extract macroblock header data and quantized coefficients for the CABAC encode component (such as CABAC encode 1118) to encode. In some embodiments, the data may be sent from the CAVLC decode component to the CABAC encode component using a macroblock data FIFO (such as MB data FIFO 1116) that contains three sections, in the following order: macroblock header information, significance map information, and quantized coefficient data. The output of the CABAC encode component (e.g., a single contiguous CABAC encoded bit stream) may be sent to the bit writer (such as BitWrite 1120). Note that significance maps may not be required for CAVLC decode but may be generated by it to reduce the complexity of CABAC encode. In some embodiments, the significance map may include a last significant coefficient index and one or more significant coefficient flags (e.g., one flag per coefficient, organized in block order). The quantized coefficients may be extracted in zig-zag order (e.g., either 8×8 zig-zag or 4×4 zig-zag order, depending on the transform size. In some embodiments, quantized coefficients may be signed 16-bit values.

Bit Writer

In some embodiments, the bit writer (such as BitWrite 1120) may receive encoded block data from the CABAC encoder 1118 or the bypass queue 1126, insert start codes into the bit stream (e.g., before inserting header data) and provide a contiguous bit stream to the DMA output interface (such as DMA output interface 1122). For example, when header data is sent through the bypass queue, the bit writer may insert a start code into the bit stream before inserting the header data received from the bypass queue. In some embodiments, the bit writer may need to finish writing any macroblock data from the CABAC encode component before inserting the header.

In some embodiments, when transcoding a macroblock, neighbor data from the macroblock above may be used in predicting syntax elements in the current macroblock. In some embodiments, left neighbor data may be maintained by the transcode component (such as transcoder 1100), and top neighbor data may be maintained in a buffer in external memory. In some such embodiments, before transcoding a macroblock, top neighbor data may be read from DMA. After transcoding the macroblock, neighbor data may be written to DMA for use in processing macroblocks on the next row.

Transcoder Modes of Operation

As previously noted, the transcode component (sometimes referred to as the transcode engine) may operates in two different modes, a CAVLC mode (which may also be referred to as bypass mode) or a CABAC mode. In CAVLC mode, the operations of the transcoder core may be elided. In this mode, the bit reader may be configured to merge four CAVLC encoded input bit streams (one for each row of a quadrow) into a single bit stream, remove start codes and/or other header information, parse and remove synchronization markers or other messages, and send all other data through the bypass queue to the bit writer. As previously noted, a new start code may be inserted by the bit writer before the header. In this mode, the bit writer may receive an input bit stream from the bypass queue, insert start codes and/or other information into the bit stream, and then write the final output bit stream to DMA.

In CABAC mode (which may also be referred to as transcode mode), the bit reader may again be configured to merge four CAVLC encoded input bit streams (one for each row of a quadrow) into a single bit stream, remove start codes and/or other header information, and parse and remove synchronization markers or other messages. However, in this mode, the bit reader may be configured to send header data through the bypass queue to the bit writer, and to send encoded block data (e.g., CAVLC block data) to the transcoder core (more specifically, the CAVLC decode component of the transcoder core). In this mode, the CAVLC decode component may be configured to decode those inputs and to send the decoded syntax elements to the CABAC encode, which may encode them using CABAC encoding and then forward the CABAC encoded bits to the bit writer. In this mode, the bit writer may receive CABAC encoded block data from the CABAC encode component, and may be configured to re-insert the header codes that were removed by the bit reader (e.g., start codes and/or other header codes that were received from the bypass queue), and synchronize the insertion of this header information into the output bit stream. The bit writer may then write the final output bit stream to DMA.

CABAC Encode

In some embodiments, the CABAC encode (CBE) component (sometimes referred to as a CBE engine) is part of the transcode component (or transcode engine). This component may be configured to consume macroblock data that has been decoded by the CAVLC Decode component and to produce a CABAC encoded bit stream. In at least some embodiments, the CABAC encode component may take the following inputs: global parameters of the video encoder in which it is implemented, and macroblock header and coefficient data, as decoded by the CAVLC decode engine. For regular bin encoding, the CABAC encode component may perform context-adaptive binary arithmetic coding as specified by the H.264 recommendation. As described in more detail below, for each context-adaptive binary arithmetic coding operation, the CABAC encode component may receive a syntax element and (if it is not a binary representation) binarize the received syntax element. The binarized syntax element may include (and/or be combined with) control information and/or neighbor information that determines the context to use for coding the syntax element. Given the determined context, the CABAC encode component may access a context lookup table, which may output a probability associated with the context. This probability may be input to a binary arithmetic coding engine within the CABAC component, which may mathematically code the syntax element and output bits of a CABAC encoded bit stream.

In general, a binary arithmetic coding operation divides a unit interval (from 0 to 1) into increasingly smaller portions of the interval (e.g., through repeated sub-dividing), each of which is represented by one of two symbols. For each division of the interval (or sub-interval) each of the symbols has an associated probability. For example, if the probability of coding symbol A is 0.6 and the probability of coding symbol B is 0.4, a first symbol for the encoded result of A may indicate a value between 0 and 0.6, while a first symbol for the encoded result of B may indicate a value between 0.6 and 1. The A portion of the unit interval may be further sub-divided according to the A and B probabilities. In this example, the A sub-portion of the A portion of the unit interval (which may indicate a value between 0 and 0.36) may have a probability of 0.6×0.6 (or 0.36), the B sub-portion of the A portion of the unit interval (which may indicate a value between 0.36 and 0.6) may have a probability of 0.6×0.4 (or 0.24), the A sub-portion of the B portion of the unit interval (which may indicate a value between 0.6 and 0.84) may have a probability of 0.4×0.6 (or 0.24), the B sub-portion of the B portion of the unit interval (which may indicate a value between 0.84 and 1.0) may have a probability of 0.4×0.4 (or 0.16), and so on. In some embodiments, the outputs of the binary arithmetic coding may be represented by a bit stream of 1's and 0's (e.g., with a bit value of 0 representing a symbol A, and a bit value of 1 representing a symbol B), and this bit stream is a compressed representation of the input syntax element.

In some embodiments, a context-adaptive binary arithmetic coding operation may be dependent on the context of the input. For example, when coding a coefficient of a particular macroblock (e.g., a coefficient representing a motion vector difference), the CABAC encode component may look at one or more coefficients of one or more neighbors (e.g., a macroblock above or to the left of the macroblock currently being coded), and the calculated probability of coding A or B may be dependent on the results of coding the coefficients of the neighbors. In other words, there may be one set of probabilities for A and B given certain coding results for the neighbors, and a different set of probabilities for A and B given different coding results for the neighbors. In another example, if the context under which the current syntax element (e.g., a coefficient of the particular macroblock being processed) is to be coded is conditioned based on neighbor coefficients n1 and n2 (which may be two coefficients for the same neighbor or coefficients from two different neighbors), each of which is binary, there may be four possible contexts under which the current syntax element can be coded (one for each combination of the possible values for n1 and n2), and there may be a different probability associated with each of those four contexts. In some embodiments, by conditioning the context of the syntax elements being coded, the entropy limit may be reduced (e.g., the bit rate required to represent those syntax elements may be reduced), which may lead to better compression.

As described in more detail below, in some embodiments, the binary arithmetic coding engine may operate on binarized syntax elements (and bits thereof) in one of three bin coding modes. In the regular bin coding mode, the binary arithmetic coding engine may perform a context-adaptive binary arithmetic coding operation such as that described above. However, when the probability of a bin being coded with one of the two possible symbols is roughly one-half (e.g., when the probability of coding a symbol A and the probability of coding a symbol B is roughly equal), at least some of the computations of the regular bin coding mode of the CABAC encode component may be elided, and the bin may be coded in a bypass bin coding mode instead. In this case, performing the arithmetic coding computations described above may not be a good use of resources, since it will not lead to much compression (given the random nature of the syntax element). In some embodiments, the coding engine (or another component of the block processing pipeline) may be configured to make decisions about whether to code a given binarized syntax element (and bits thereof) in the bypass bin coding mode or in the regular bin coding mode based, at least in part, on a trade-off between computation effort and quality. For example, in one such embodiment a decision may be made to code a particular bin in the bypass bin coding mode if the difference or ratio between the delta improvement in throughput (due to a reduction in computation complexity) that would be gained by coding the bin in the bypass bin coding mode rather than in the regular bin coding mode (by any suitable measure of throughput) and the delta degradation in quality that would result from coding the bin in the bypass bin coding mode rather than in the regular bin coding mode (by any suitable measure of compression quality) is greater than a pre-determined threshold value Note that in at least some embodiments, the context lookup table may be dynamic. In such embodiments, once the context for a binarized syntax element has been determined and the coding for the binarized syntax element has been performed, the probability stored in the context lookup table for that context may be updated based on the coding results. For example, in some embodiments, the block processing pipeline (or a context-adaptive encode component thereof) may include logic for calculating an updated probability based on the currently stored probability and the coding results. In some embodiments, this logic may implement a state machine that transitions between a finite number of context model states (e.g., 64 finite probability states) given the currently stored probability state and the coding results. For example, if the current probability state for a given context is 0.35, there may be two or more possible probability states to which the current probability state can transition, based on the inputs to the transition logic (i.e., the state machine).

For example, if the initial probability associated with content 10 (e.g., the value that was stored in the context lookup table at a context index of 10) was 0.5, each time an element in that context is encoded, the probability may be updated in the context lookup table. In this example, each time the output of the encoding is a 1, the probability associated with context 10 may be increased (e.g., to 0.52, then 0.54, etc.). Conversely, each time the output of the encoding is a 0, the probability associated with context 10 may be decreased (e.g., to 0.48, then 0.46, etc.). In some embodiments, after some number of syntax elements with the same context have been encoded, the context lookup table may store a rough estimate of the actual probability for that context. Note that there may be a variety of approaches taken for initializing the probabilities for each context, in different embodiments. For example, the H.264 standard specifies three different initialization tables, any of which may be used to initialize the probabilities. These and other initialization approaches may attempt to optimize the initial probabilities based on observed behavior for different types of video encoding applications and/or video encoding workloads.

In some embodiments, the CABAC encode (CBE) engine may include (or utilize) the following functional blocks: a macroblock FIFO (which contains macroblock data generate and written by the CAVLC decode component), a syntax element process (SEP) block (which sequences through syntax elements defined by the H.264 standard, reading them from the macroblock FIFO, and generating syntax commands for various downstream blocks), a binary arithmetic coding (BAC) process block (which processes one syntax command a time, converts the syntax element value into a binary code, serializes the binary code into a single bin, codes the bin mathematically with its corresponding probability model, and outputs the bit stream), and a context model process block (which stores the intermediate state of the probability model in context memory, reads a probability for a particular context out to the bin coder, and updates the probability for the context in memory after the bin is coded).

Figure 12:
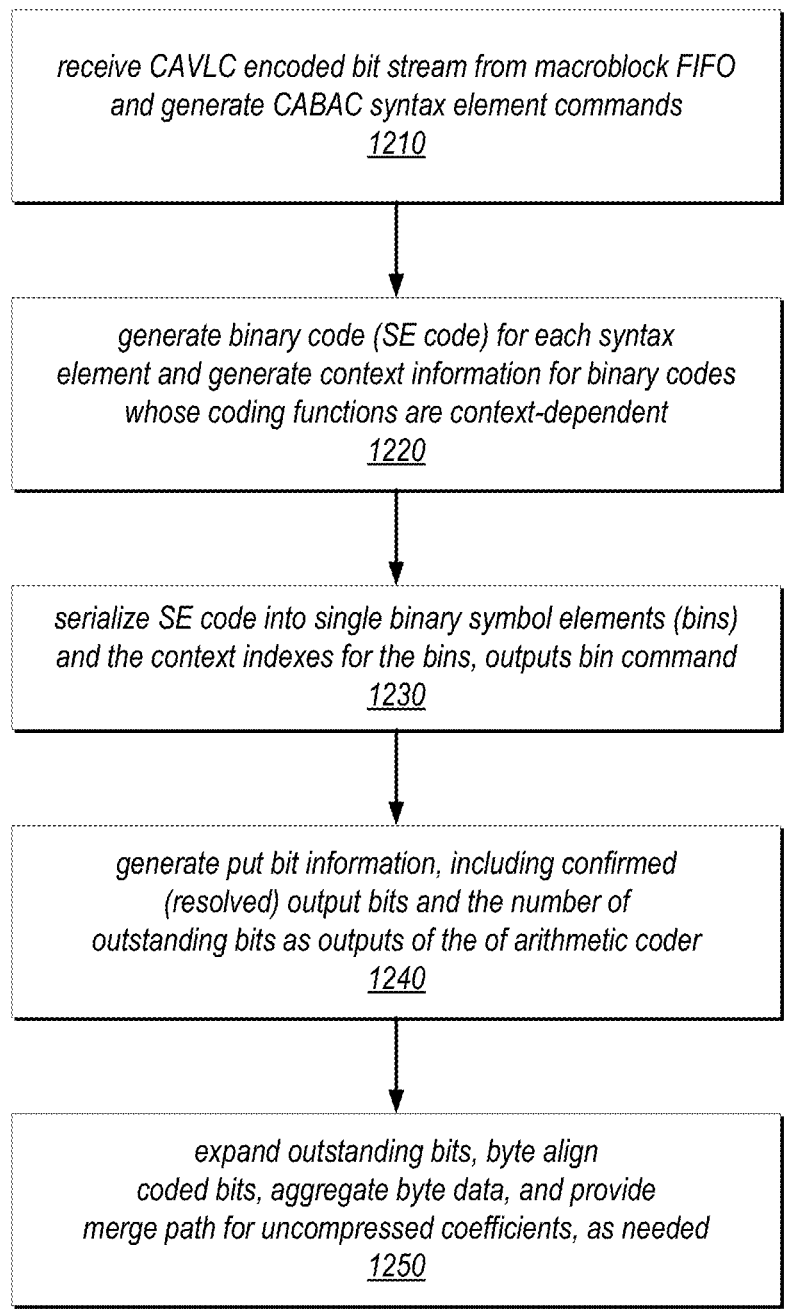
FIG. 12 is a flow diagram illustrating one embodiment of a method for performing CABAC encoding.

One embodiment of a method for performing CABAC encoding is illustrated by the flow diagram in FIG. 12. In this example, it is assumed that the CBE engine includes three main pipelines: a syntax pipeline, a coding pipeline, and a bit stream output pipeline. In the coding pipeline and the bit stream output pipeline, the functionality may be broken down into several sub-pipelines. In some embodiments, there may be FIFOs placed between various ones of the pipelines and/or sub-pipelines. These FIFOs may provide flow control for passing data to downstream blocks or for stalling data from upstream blocks if a backpressure situation occurs. As illustrated at 1210 in FIG. 12, a method for performing CABAC encoding may include receiving a CAVLC encoded bit stream from an upstream macroblock FIFO and generating CABAC syntax element commands. For example, in some embodiments, a syntax element process block of the syntax element pipeline may be configured to processes CABAC syntax elements, which are defined by the H.264 standard, and to generate syntax element (SE) command packets. In some embodiments, each SE command packet may include syntax type data (which may specify a syntax value, along with its corresponding index and flag information for performing a CABAC coding computation) and/or pipeline control information (which may specify various control packets, e.g., packets that do not involve any computation, but control operations such as resetting the coding states or flushing a coded bit stream).

As illustrated at 1220 in FIG. 12, a method for performing CABAC encoding may include generating binary code (SE code) for each syntax element and generating context information for any binary codes whose coding functions are context-dependent. For example, in some embodiments, a binarization and neighbor process (BNP) block of the coding pipeline may be configured to generate a binary code for each syntax element. In one example, the BNP block may convert a 4×4 block of data to a one dimensional representation by performing a zig-zag scan and/or may binarize the data in accordance with the H.264 standard or another video encoding or compression standard. In some embodiments, binarizing a syntax element may include computing a significance map. In such embodiments, the output of the significance map computation may be sent to the binary arithmetic coder as an input.

In some embodiments, the binary codes whose bin coding functions are dependent on a context model may be referred to as regular bins. For those syntax elements whose coding functions depend on neighboring macroblock information, the BNP block may be configured to look up stored information for macroblocks above or to the left of the macroblock for which syntax elements are currently being processed and to generate the corresponding context information dependent on that neighbor information. For example, in some embodiments, neighbor information may be stored in a neighbor information register file. In some embodiments, the binary codes whose bin coding functions are not dependent on a context model may be referred to as bypass bins.

In some embodiments, the coding pipeline may be configured to process the SE command packets and perform a CABAC coding function (as defined by the H.264 standard), in several steps. For example, a method for performing CABAC encoding may include serializing the SE code into single binary symbol elements (bins) and the context indexes for the bins, and outputting the corresponding bin command(s), as illustrated at 1230 in FIG. 12. For example, in some embodiments, for each SE code, a bit serialization and context selection process (BCP) of the coding pipeline may be configured to receive the SE code and serialize it into a single bin. In some embodiments, while the bit serialization operation serializes the SE code, a context model index (the context model index associated with the bin) may be looked up and output along with the bin. As noted above, the outputs of the BCP may include bin commands (which may include regular bin, bypass bin, and terminate bin). In some embodiments, the context model index may be computed according to the lookup steps that are defined by the H.264 standard. However, the video encoders described herein may or may not support all possible contexts. For example, while 1024 contexts may be defined, some embodiments may support fewer than 1024 contexts (e.g., 684 contexts or another number of contexts), each of which is associated with a context model (sometimes referred to as a probability model) that includes data representing a conditional probability.

In some embodiments, the context model states may include an index that represents the least probable symbol (LPS) probability and the value of the most probable symbol (MPS). In some embodiments, each entry in the context memory may contain four content model states (e.g., four pairs of these values). In some such embodiments, when a context model lookup is performed using a given context index value, the context index value may first be mapped to the context memory space. For example, the upper bits of the mapped address may be sent to the context memory as a read address, while the lower bits of mapped address may be used to select one of the four context model states read from the addressed entry in the context memory. In some embodiments, the context model that is referenced in the immediately following bin coding may be buffered (e.g., pipelined) into local registers. In such embodiments, a lookup operation for the next context index may find that the desired context model is already stored in the local registers. In this case, the buffered context model may be used without having to read it from the context memory. If a buffered context model is not referenced by the context index for the next lookup operation, any state that was updated in the buffer for a buffered context model may be written back to the context memory.

As illustrated at 1240 in FIG. 12, a method for performing CABAC encoding may include generating put bit information, including confirmed (resolved) output bits and the number of outstanding bits as outputs of the of arithmetic coder. For example, in some embodiments, a bin coding process (BCP) block of the coding pipeline may be configured to generate the put bit information, which may include the confirmed output bits that were output from the arithmetic coder. In some embodiments, once a decisive bit value is determined, the put bit function may be configured to write out the determined bit value and the number of outstanding bits.

As illustrated at 1250 in FIG. 12, a method for performing CABAC encoding may include expanding the outstanding bits, byte aligning the coded bits, aggregating the byte data, and/or providing a merge path for uncompressed coefficients, where needed. For example, in some embodiments, a bit stream output pipeline (which may include a bit generation process and a byte packing process) may be configured to assemble the coded bits into bytes and to send the final output data to the bit stream handler. For example, a bit generation function may be configured to receive the resolved output bit and the number of outstanding bits that were output from the coding pipeline, expand the confirmed outstanding bits, and byte align the coded bits. A byte packing function may be configured to aggregate the byte data that was output from the bit generation function. In some embodiments, the byte packing function may also be configured to provide the merge path for the uncompressed coefficients, under certain circumstances. In that case, the coefficients may be sent and aligned at a byte boundary.

In some embodiments, when coding a regular bin (e.g., using binary arithmetic coding or, more specifically, context-adaptive binary arithmetic coding), the corresponding probability state (which is maintained in the context model associated with the regular bin) may be read from the context memory. The probability state read from the context memory may be used as part of the computation of the code interval range value and the code interval low value for the context-adaptive binary arithmetic coding operation. As previously noted, in some embodiments, the probability state may be adjusted by looking up a value in a transition tables that is dependent on the bin value and the most probable symbol for that bin value, and the adjusted state may be written back to the context memory.

As previously noted, when coding a bypass bin, no context model may be needed for the computation of the code interval range value and the code interval low value. In some embodiments, for each bin coded as a bypass bin, the code interval range value and the code interval low value may be reduced. For example, when the code interval range value is smaller than 0.25, the code interval range value and the code interval low value may be left shifted until the code interval range value is above 0.25. This process may be referred to as renormalization. During renormalization, 0's or 1's may be output depending on the range of the code interval low value. For example, there may be no bits output if the code interval low value is not in the decisive range. In this case, a counter may be used to keep track of the outstanding bits if consecutive bin coding operations cannot identify the determined output bits, in some embodiments.

Context Memory Management

As previously noted, a context lookup table may store a context model to be used in various context-adaptive coding operations, and this context model may include probability values or other context model state for each video encoding context supported by the video encoder. In some embodiments, a block processing pipeline of the video encoder may include a context cache (or a local buffer that exhibits at least some of the characteristics of a cache) that stores probability values for at least some of the supported contexts (e.g., frequently and/or recently accessed probability values). Some video encoding contexts are defined within the specifications of various video encoding or compression standards. For example, each of the contexts may be defined in terms of the values of different groups of syntax elements (e.g., a motion vector difference, various significant coefficients, a macroblock type, a sub-macroblock type, a skip flag, etc.). As described above, the context lookup table may store a context model state, which in some embodiments may include an index that represents the least probable symbol (LPS) probability and the value of the most probable symbol (MPS).

In some embodiments, the context memory (i.e., the memory in which the context lookup table is implemented) may be an external memory (e.g., it may be a memory that is external to the block processing pipeline, and may have a read or write latency of several processing cycles). In other embodiments, the context memory may be implemented as an internal RAM (e.g., a single port RAM that can be accessed for reading or writing only one time per processing cycle). Because the context memory may need to be both read and written (preferably in the same processing cycle) in order to perform a context lookup and update, in some embodiments, context updates may be cached. As previously noted, in some embodiments, the context cache may be implemented as a collection of registers that can be accessed multiple times per processing cycle, and this approach may allow the block processing pipeline to support multiple context updates per cycle. In some embodiments, caching contexts when they are accessed and/or pre-fetching contexts into the cache may allow the CBE engine to process more than one bin per cycle, which may substantially improve throughput in the block processing pipeline. Note, however, that the number of bins that can be processed per cycle and the number of context updates that can be performed per cycle may be independent of each other. In other words, in some embodiments, the CBE engine may be able to process multiple bins per cycle even if only one context can be updated per cycle.

Because the context memory lookup table, which may be maintained in a relatively slow context memory (e.g., memory that is external to the block processing pipeline, or an internal single port memory) may be accessed for reading or writing very often, the organization of the lookup table (e.g., the way that entries are mapped to contexts, and the way they are indexed and/or accessed) may have a significant effect on the performance of the context-adaptive encoding process and/or of the block processing pipeline as a whole. Unlike in some systems in which the context lookup table is implemented as an expensive dual-port memory, the video encoders described herein may address potential memory latency issues involving the context lookup table through the use of the context cache. As described in more detail herein, the context cache may be inserted in the block processing pipeline (or in a coding sub-pipeline thereof) between the context memory lookup table and the coding engine (e.g. a binary arithmetic coding engine), in some embodiments. In such embodiments, if one context (e.g., context 10) is being used often (e.g., if many of the syntax elements are being coded under this same context), at least some of the coding operations may be made more efficient by caching the location of that one context (e.g., by caching the information found in the lookup table at the location accessed at index 10). In this case, the cached context model state may be updated in the cache following a coding operation (rather than being immediately updated in the lookup table in the slower context memory), and the context model state may be made coherent in the lookup table later.

Figure 13:
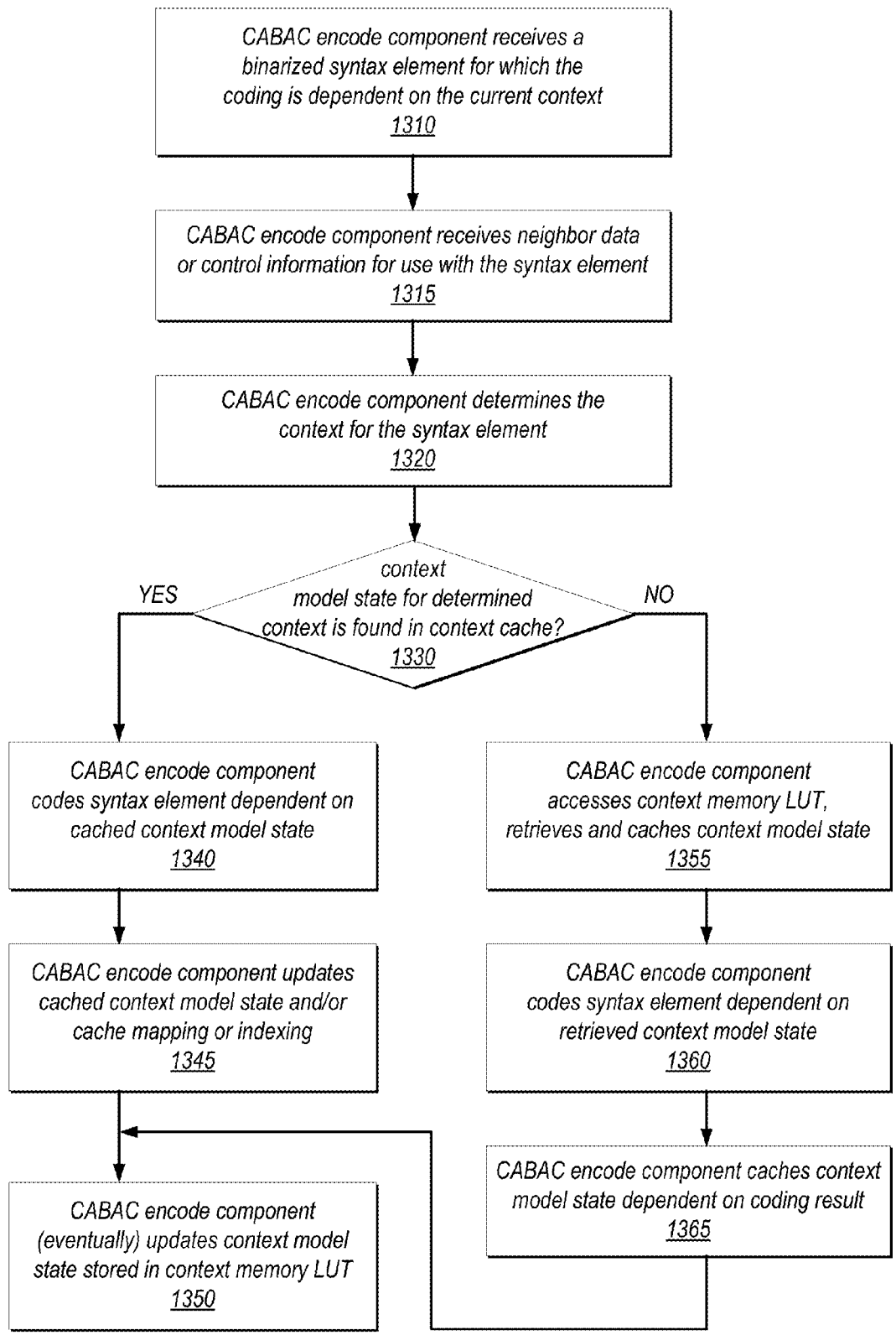
FIG. 13 is a flow diagram illustrated one embodiment of a method for performing context-adaptive encoding using cached context model states.

One embodiment of a method for performing context-adaptive encoding using cached context model states (e.g., probability values) is illustrated by the flow diagram in FIG. 13. In this example, the context-adaptive encode component implements context-adaptive binary arithmetic coding (CABAC encoding). In other embodiments, the context-adaptive encode component may implement another type of encoding that is adaptive to the context of the elements to be encoded (e.g., neighbor data, control information, etc.) Note also that while this example describes a particular operation for coding a syntax element that is dependent on a context model, as described herein, the coding of other syntax elements may not be dependent on a context model state (e.g., the probability for those syntax elements may be fixed). Note also that while this and other examples describe a context cache, the functionality of the context cache may be implemented by another type of local buffer (e.g., a collection of registers).

As illustrated at 1310 in FIG. 13, the method may include a CABAC encode component receiving a binarized syntax element for which the coding is dependent on the current context. The method may also include the CABAC encode component receiving neighbor data and/or control information suitable for use when encoding the syntax element using CABAC encoding, as in 1315. The method may include the CABAC encode component determining the context for the syntax element, as in 1320. For example, the CABAC encode component may determine a context index with which to access the context model state (e.g., a probability value) to be used in coding the syntax element, based on the received binarized syntax element data, any received neighbor data, any received control information, and/or any other applicable context information As illustrated in this example, if the context model state for the determined context is not found in context cache, shown as the negative exit from 1330, the method the context model state for the determined context may be obtained from memory. For example, the method may include the CABAC encode component accessing the context memory LUT (e.g., according to the determined context index), and retrieving the context model state for the determined context (as in 1355). The method may also include the CABAC encode component coding the syntax element dependent on the retrieved context model state (as in 1360) and caching the context model state (e.g., an updated context model state) dependent on the coding result (as in 1365). As previously noted, in some embodiments, the context model state that is obtained and used in a coding operation may be updated (e.g., a probability value may be increased or decreased) based on the coding results. In some embodiments, the block processing pipeline (or context-adaptive encode component thereof) may be configured to determine if and/or when a context model state should be cached (in the context cache) dependent on the number of times that the context model state has been accessed and/or the frequency at which the context model state has been accessed in the context memory LUT.

As illustrated in FIG. 13, if the context model state for the determined context is found in the context cache, shown as the positive exit from 1330, the method may include the CABAC encode component coding the syntax element dependent on the cached context model state (as in 1340). As described in more detail herein, the method may also include the CABAC encode component updating the cached context model state and/or the cache mapping or indexing (as in 1345) based on the results of the coding operation and/or other coding operations. In some embodiments, until or unless the cached context model state for the determined context is evicted from the context cache (or flushed from a local buffer or collection of registers), the cached context model state may be accessed for use in coding one or more other syntax elements if and when the context under which the other syntax elements is the (same) determined context.

As illustrated in FIG. 13, in either case (e.g., whether or not the context model state for the determined context was found in context cache), the method may include the CABAC encode component (eventually) updating the context model state that is stored in the context memory LUT, as in 1350. In other words, subsequent to storing and/or modifying the context model state (e.g., the probability value) for a given context in the cache, the CABAC encode component may update the probability for the given context in the context memory.

Figure 14A:
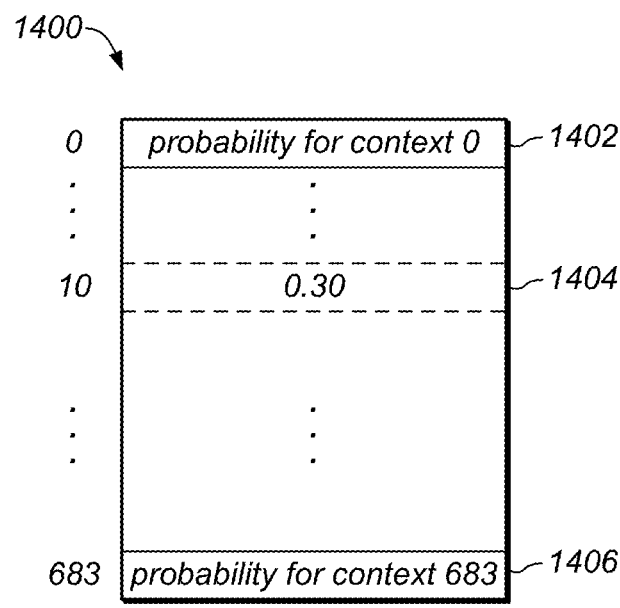
FIG. 14A and FIG. 14B illustrate example context memory lookup tables (LUTs), according to different embodiments.
Figure 14B:
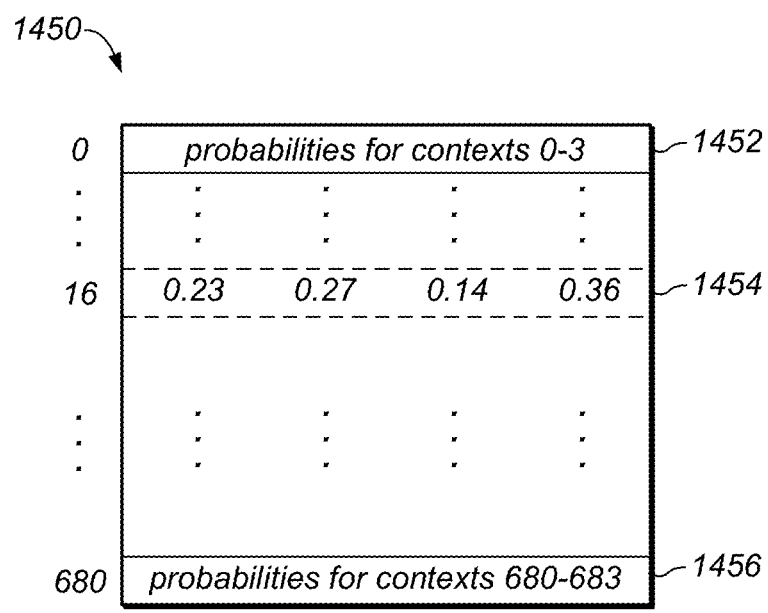

FIG. 14A and FIG. 14B illustrate example context memory lookup tables (LUTs), according to different embodiments. For example, FIG. 14A illustrates a context memory lookup table 1400 that stores a single context model state (e.g., probability value) in each of 684 entries of the table, and these entries are accessed using index/address values [0:683]. In the illustrated example, entry 1402, accessed using context table index/address 0, stores a probability value for context 0. Similarly, entry 1406, accessed using context table index/address 683, stores a probability value for context 683. In this example, entry 1404, accessed using context table index/address 10, stores a probability value of 0.3 for context 10.

As previously noted, in some embodiments, each entry of the context memory LUT stores multiple context model states (e.g., each entry includes context model state for multiple contexts). For example, FIG. 14B illustrates a lookup table 1450 that stores four context model states (e.g., four probability values) for consecutively addressed contexts in each of 171 entries of the table, and each one of the 684 context model states stored in lookup table 1450 is a context model state (e.g., a probability value) for a different one of the consecutively addressed contexts. In this example, each of the 171 entries in lookup table 1450 is accessed according to the upper bits (e.g., all but the two least significant bits) of index/address values [0:683], and the two least significant bits are used to select one of the four context model states stored in the entry. For example, entry 1452, accessed by the upper bits of context table index/addresses 0-3, stores probability values for contexts 0-3. Similarly, entry 1456, accessed by the upper bits of context table index/addresses 680-683, stores probability values for contexts 680-683. In this example, entry 1454, accessed by the upper bits of context table index/address 16-19, stores probability values of 0.23, 0.27, 0.14, and 0.36 for contexts 16-19, respectively.

Note that while in the example illustrated in FIG. 14B, each entry stores context model states (e.g., probability values) for multiple consecutively addressed contexts, in other embodiments, this may not be the case. In other words, in other embodiments, there may be different types of mappings between context indexes and the multiple context model states that are stored in the same context memory lookup table entry.

Figure 15:
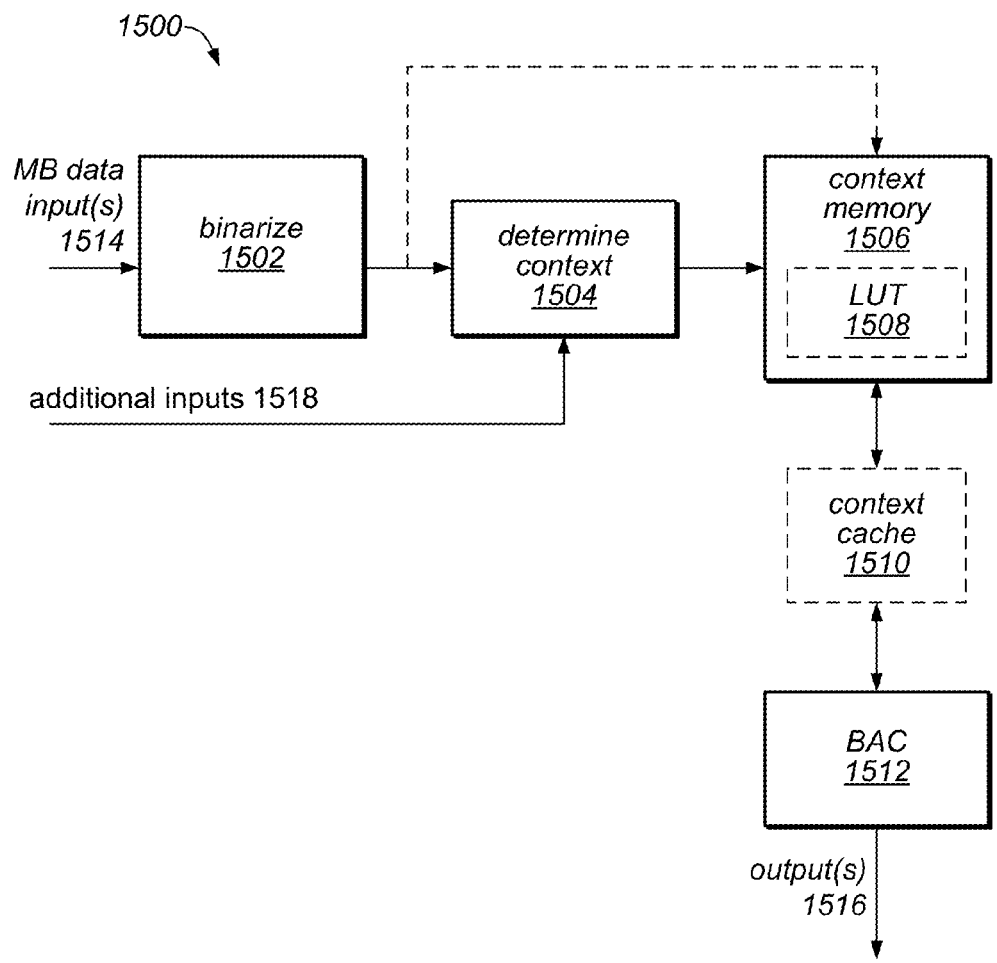
FIG. 15 is a block diagram illustrating the use of a context cache in a component that is configured to implement a context-adaptive encoding process, according to one embodiment.

FIG. 15 is a block diagram illustrating the use of a context cache in a component that is configured to implement a context-adaptive encoding process, according to one embodiment. In this example, the CABAC encode component 1500 includes a binarization block 1502 that receives macroblock data input(s) 1514 (e.g., syntax elements representing a block of pixels from a video frame, such as motion vector difference information, significant coefficients, a macroblock type and/or subtype, or a skip flag). As illustrated in FIG. 15, at least a portion of the outputs of binarization block 1502 (e.g., at least a subset of the binarized bit stream) may be passed to context determination block 1504 and/or to context memory 1506.

In this example, the CABAC encode component 1500 (or more specifically, the context determination block 1504) receives (or has access to) additional inputs 1518 (e.g., neighbor data, control information, and/or any other information that may be suitable for use in determining the context under which the input syntax elements should be coded). Based on its received inputs, context determination block 1504 may determine the context under which various syntax elements should be coded (e.g., by binary arithmetic coding block 1512).

In this example, lookup table (LUT) 1508 within context memory 1506 may store context model state (e.g., probability values) for a set of 1024 contexts defined by the H.264 standard or for any subset of the defined contexts that are supported by CABAC encode component 1500 (e.g., 684 contexts). In different embodiments, each entry in LUT 1508 may contain context model state for a single context or may store context model state for multiple contexts (e.g., four contexts). In the illustrated example, CABAC encode component 1500 includes a context cache 1510, (which may be a local cache, a local buffer, or a collection of registers that stores context model state for some contexts, such as recently or frequently accessed context model state information). In some embodiments, when context model state is retrieved from LUT 1508 (e.g., for the use of binary arithmetic coding block 1512) and cached in context cache 1510, any context model state stored in the same entry of LUT 1508 (e.g., context model state for multiple consecutively indexed contexts that is stored in the same table entry) may also be cached with context cache 1510.

As described herein, if the coding for a given syntax element is not dependent on the current context (e.g., if the probability value for the given syntax element is known and/or fixed), the context determination may be skipped. This is illustrated in FIG. 15 by the dashed line from binarization block 1502 to context memory 1506 that bypasses context determination block 1504. On the other hand, if the coding for a given syntax element is dependent on the current context the output of context determination block 1504 (e.g., a context table index for the determined context) may be provided to context memory 1506 in order to access the appropriate entry in the context memory lookup table (LUT 1508) for the determined context.

In some embodiments, once the context and corresponding context table index have been determined (or if they were known/fixed), the binary arithmetic coding block 1512 may be configured to read the context model state (e.g., probability value) for the determined context from LUT 1508 in context memory 1506 (e.g., using the determined context table index). In some cases, binary arithmetic coding block 1512 may be configured to read the context model state (probability value) for the determined state from context cache 1510 (e.g., using the determined context table index) if it has already been retrieved and cached for use in a previous coding operation or if it was previously cached due to being stored in the same entry of LUT 1508 from which context model state for another coding operation was retrieved. In this example, binary arithmetic coding block 1512 may also be configured to encode the received macroblock data inputs (e.g., syntax elements) based on the retrieved context model state for the determined context to output a CABAC encoded bit stream as part of its outputs 1516. In some embodiments, binary arithmetic coding block 1512 (or another functional block within CABAC encode component 1500) may be configured to update the context model state for the determined context based on the results of the coding operation and to write the updated context model state for the determined context out to context cache 1510 and/or to context memory 1506 (e.g., in order to update the entry for the context in LUT 1508).

In some embodiments, the context address mapping may be optimized initially and/or subsequently re-mapped based on observed access patterns. For example, a component of the context-adaptive encode component or block processing pipeline (or a component that is separate from the context-adaptive encode component or block processing pipeline) may be configured to monitor accesses to the context model states stored in the context memory lookup table (e.g., tracking the accesses that target each index in the set of indexes for the table) and determine what the most accessed context is (or what the top few contexts are) over a wide range of video content. In some embodiments, the tracked information (e.g., various statistics about the patterns of accesses, cache miss rates cache hit rates, etc.) may be analyzed to determine different context address mappings that are likely to improve the performance of the context cache. For example, in addition to monitoring the access frequency of the context memory index, the order in which different contexts are accessed may be monitored and the ordering of the contexts in the lookup table may be updated so that contexts that are accessed sequentially may be stored in sequential locations in memory. In some embodiments, the block processing pipeline may be configured to generate statistics about the coefficients and/or other syntax elements in the input video stream that may be used to dynamically adjust the way the contexts are stored in memory so that the ordering is beneficial to the context caching operation.

For example, some contexts tend to follow one another, and may be grouped in the memory to improve latency. In a specific example, a portion of a sequence of syntax elements may be encoded under context 10, and may typically be followed by a portion of the sequence of syntax elements that is encoded under context 25, which may be followed by a portion of the sequence of syntax elements that is encoded under context 30, and these contexts may all be correlated. In some embodiments, the context model states for these contexts may be grouped together in the lookup table, so that if one of them is accessed in the lookup table, all of them may be pulled from the lookup table together and cached for faster access during the encoding of the entire sequence. Based on these and/or other observed access patterns, the interface between the context cache and the lookup table may be optimized, as described in more detail herein. In other words, in these and other situations in which the context access pattern is known or can be predicted with good success, the ordering of the contexts in the lookup table may be configured (initially and/or dynamically) so that contexts that are predicated to be accessed may be pre-fetched in the cache.

In some embodiments, a programmable re-mapping table may allow software to optimize lookup table and/or context cache access patterns based on the content of the input video stream. In some embodiments, statistics about context cache miss rates and/or hit rates may be tracked and used to determine the best mapping. For example, the lookup table and/or context cache may be organized (e.g., based on such statistics) so that cache misses are minimized (e.g., so that the cache can be populated with the context entries that are most likely to be accessed). In another example, if it is determined (e.g., on the fly during runtime) that the content is changing with regard to some characteristic in a way that suggests that a different mapping would be more efficient, the indexing to at least some of the entries in the lookup table may be modified so that it maps more efficiently to the context cache.

Figure 16:
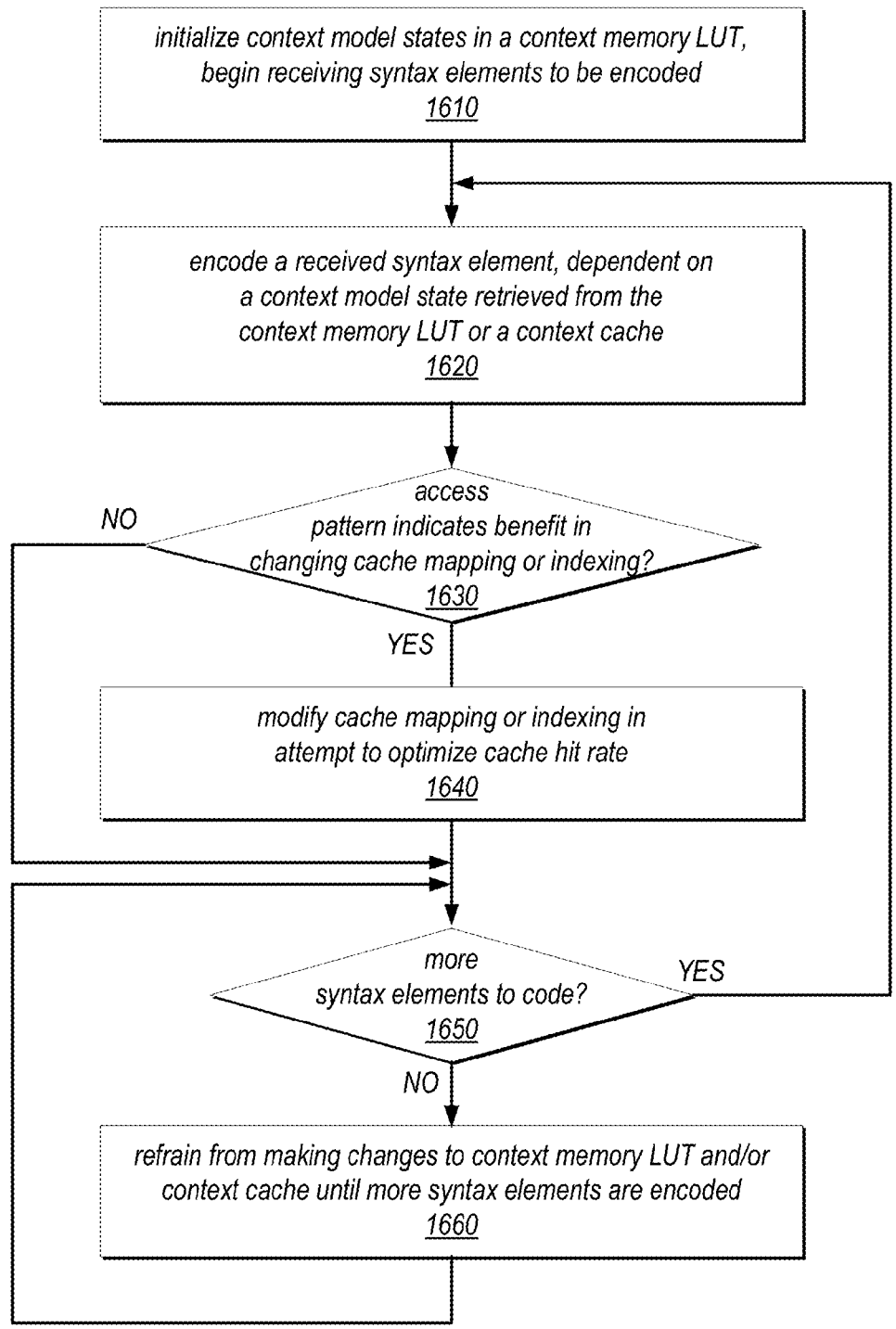
FIG. 16 is a flow diagram illustrating one embodiment of a method for managing a context memory and an associated context cache.

One embodiment of a method for managing a context memory and an associated context cache (e.g., for initializing, utilizing, and/or performing a re-mapping operation for the context memory and context cache) is illustrated by the flow diagram in FIG. 16. As illustrated at 1610, in this example, the method may include initializing the context model states in a context memory lookup table (LUT), and beginning to receive syntax elements to be encoded. As previously noted, any of a variety of standard or custom initialization approaches (e.g., standard or custom initialization tables or functions), and the particular approach applied may be selected in an attempt to optimize the initial probabilities based on observed behavior for different types of video encoding applications and/or video encoding workloads. As illustrated in this example, the method may include encoding one of the received syntax elements using a context-adaptive encoding technique in which the encoding operation is dependent on a context model state retrieved from the context memory LUT or a local context buffer or cache (as in 1620). For example, in some embodiments, the method may include attempting to locate the appropriate context model state in the context cache, and retrieving it from the context memory LUT only in response to failing to locate it in the cache. As described herein, in some embodiments, the encoding operation may include caching a new context model state in the context cache (if no context model state for that context is currently stored in the context cache), updating a cached context model state (depending on the results of the encoding), and/or updating a context model state stored in the context memory LUT, as shown in FIG. 13 and described above.

As illustrated in this example, if an observed pattern of access the context model states for various contexts does not indicate that there would be any benefit (or any significant benefit) in changing the cache mapping or indexing, shown as the positive exit from 1630, the method may include continuing to encode syntax elements as they are received and watching for such a pattern (e.g., collecting and/or tracking statistics about context cache miss rates and/or hit rates, the contexts for which context model states are being retrieved, etc.). This is illustrated in FIG. 16 by the path from the negative exit of 1630 to 1650 and from the positive exit of 1650 to 1620.

If, however, an observed access pattern indicates (or suggests) that there could be a benefit realized by making a particular change to the cache mapping or indexing (e.g., a benefit in terms of the performance of the context cache or of the overall encoding process), shown as the positive exit from 1630, the method may include modifying at least some aspect of the cache mapping and/or indexing in attempt to improve performance (e.g., to optimize the cache hit rate, so that fewer context model states need to be fetched from the lookup table in a slower context memory), as in 1640. For example, in some embodiments, different context address mappings may be defined and implemented such that context model state (e.g., probability values) for contexts that are accessed sequentially may be stored in sequential locations in the context memory and/or in the context cache. As a result, the context model states for these contexts may all be cached when one of them is cached and/or they may all be evicted together when they are not likely to be accessed again soon. In some embodiments, based on observed access patterns, the method may include modifying a policy that specifies if and/or when context model states should be cached in order to optimize the policy for the observed access patterns (e.g., keeping frequently used entries in the cache longer, evicting rarely used entries sooner, etc.).

As illustrated in this example, as long as there are more syntax elements to be encoded, shown as the positive exit from 1650, the method may include continuing to encode syntax elements as they are received and watching for such a pattern (e.g., collecting and/or tracking statistics about context cache miss rates and/or hit rates, the contexts for which context model states are being retrieved, etc.). This is illustrated in FIG. 16 by the feedback from the positive exit of 1650 to 1620. If, at any point, such a pattern is observed, the method may (again, or for the first time) include modifying at least some aspect of the cache mapping and/or indexing in attempt to improve performance (e.g., to optimize the cache hit rate), as in 1640. As illustrated in this example, if, at any time, there are no additional syntax elements to be encoded, shown as the negative exit from 1650, the method may include refraining from making any changes to the context memory LUT and/or context cache until and unless more syntax elements are encoded, as in 1660. This is illustrated in FIG. 16 by the feedback from 1660 to 1650. In other embodiments, while the video encoder is not busy encoding additional syntax elements, it may be configured to make changes to the context memory LUT and/or context cache that were previously suggested by the observed access patterns and/or workload (not shown).

Example Video Encoder Apparatus

FIG. 17 is a block diagram of an example video encoder apparatus 1700, according to at least some embodiments. The video encoder apparatus 1700 may, for example, be implemented as an integrated circuit (IC) or as a subsystem on an IC such as a system-on-a-chip (SOC). In at least some embodiments, the video encoder apparatus 1700 may include a pipeline 1740 component, a processor 1710 component (e.g., a low-power multicore processor), a memory management unit (MMU) 1720, DMA 1730, and an interconnect 1750 such as a bus subsystem or fabric that interconnects the functional components of the apparatus. The processor 1710 component of the video encoder apparatus 1700 may, for example, perform frame-level control of the pipeline 1740 such as rate control, perform pipeline 1740 configuration including configuration of individual pipeline units within the pipeline 1740, and interface with application software via a driver, for example for video encoder 1700 configuration. The MMU 1720 may serve as an interface to external memory, for example for streaming video input and/or output. Pipeline 1740 component may access memory through MMU 1720 via DMA 1730. In some embodiments, the video encoder apparatus 1700 may include other functional components or units not shown in FIG. 17, or fewer functional components than those shown in FIG. 17. An example block processing method that may be implemented by pipeline 1740 component is shown in FIG. 10. An example a system-on-a-chip (SOC) that may include at least one video encoder apparatus 1700 is illustrated in FIG. 18.

Example System on a Chip (SOC)

Turning now to FIG. 18, a block diagram of one embodiment of a system-on-a-chip (SOC) 1800 that may include at least one instance of a video encoder apparatus including a block processing pipeline that may implement one or more of the block processing methods and apparatus as illustrated in FIGS. 3 through 17. SOC 1800 is shown coupled to a memory 1850. As implied by the name, the components of the SOC 1800 may be integrated onto a single semiconductor substrate as an integrated circuit "chip." In some embodiments, the components may be implemented on two or more discrete chips in a system. However, the SOC 1800 will be used as an example herein. In the illustrated embodiment, the components of the SOC 1800 include a central processing unit (CPU) complex 1820, on-chip peripheral components 1840A-1840B (more briefly, "peripherals"), a memory controller (MC) 1830, a video encoder 1700 (which may itself be considered a peripheral component), and a communication fabric 1810. The components 1820, 1830, 1840A-1840B, and 1700 may all be coupled to the communication fabric 1810. The memory controller 1830 may be coupled to the memory 1850 during use, and the peripheral 1840B may be coupled to an external interface 1860 during use. In the illustrated embodiment, the CPU complex 1820 includes one or more processors (P) 1824 and a level two (L2) cache 1822. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 1840A-1840B may be any set of additional hardware functionality included in the SOC 1800. For example, the peripherals 1840A-1840B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 1860 external to the SOC 1800 (e.g. the peripheral 1840B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 18, SOC 1800 may include at least one instance of a video encoder 1700 component, for example a video encoder 1700 as illustrated in FIG. 17 that includes a block processing pipeline 1740 component that implements a block processing method 1000 as illustrated in FIG. 10. Video encoder 1700 may be an H.264 video encoder apparatus that may be configured to convert input video frames from an input format into H.264/Advanced Video Coding (AVC) format as described in the H.264/AVC standard. The block processing pipeline 1740 may implement one or more of the block processing methods and apparatus as described herein in relation to FIGS. 3 through 16.

The CPU complex 1820 may include one or more CPU processors 1824 that serve as the CPU of the SOC 1800. The CPU of the system includes the processor(s) that execute the main control software of the system, such as an operating system. Generally, software executed by the CPU during use may control the other components of the system to realize the desired functionality of the system. The processors 1824 may also execute other software, such as application programs. The application programs may provide user functionality, and may rely on the operating system for lower level device control. Accordingly, the processors 1824 may also be referred to as application processors. The CPU complex 1820 may further include other hardware such as the L2 cache 1822 and/or and interface to the other components of the system (e.g. an interface to the communication fabric 1810). Generally, a processor may include any circuitry and/or microcode configured to execute instructions defined in an instruction set architecture implemented by the processor. The instructions and data operated on by the processors in response to executing the instructions may generally be stored in the memory 1850, although certain instructions may be defined for direct processor access to peripherals as well. In some embodiments, the data stored in memory 1850 may include weighting coefficient values to be applied for one or more neighbor pixels in a neighbor-data-based dithering operation. Processors may encompass processor cores implemented on an integrated circuit with other components as a system on a chip (SOC 1800) or other levels of integration. Processors may further encompass discrete microprocessors, processor cores and/or microprocessors integrated into multichip module implementations, processors implemented as multiple integrated circuits, etc.

The memory controller 1830 may generally include the circuitry for receiving memory operations from the other components of the SOC 1800 and for accessing the memory 1850 to complete the memory operations. The memory controller 1830 may be configured to access any type of memory 1850. For example, the memory 1850 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1830 may include queues for memory operations, for ordering (and potentially reordering) the operations and presenting the operations to the memory 1850. The memory controller 1830 may further include data buffers to store write data awaiting write to memory and read data awaiting return to the source of the memory operation. In some embodiments, the memory controller 1830 may include a memory cache to store recently accessed memory data. In SOC implementations, for example, the memory cache may reduce power consumption in the SOC by avoiding reaccess of data from the memory 1850 if it is expected to be accessed again soon. In some cases, the memory cache may also be referred to as a system cache, as opposed to private caches such as the L2 cache 1822 or caches in the processors 1824, which serve only certain components. Additionally, in some embodiments, a system cache need not be located within the memory controller 1830.

In an embodiment, the memory 1850 may be packaged with the SOC 1800 in a chip-on-chip or package-on-package configuration. A multichip module configuration of the SOC 1800 and the memory 1850 may be used as well. Such configurations may be relatively more secure (in terms of data observability) than transmissions to other components in the system (e.g. to the end points 16A-16B). Accordingly, protected data may reside in the memory 1850 unencrypted, whereas the protected data may be encrypted for exchange between the SOC 1800 and external endpoints.

The communication fabric 1810 may be any communication interconnect and protocol for communicating among the components of the SOC 1800. The communication fabric 1810 may be bus-based, including shared bus configurations, cross bar configurations, and hierarchical buses with bridges. The communication fabric 1810 may also be packet-based, and may be hierarchical with bridges, cross bar, point-to-point, or other interconnects.

It is noted that the number of components of the SOC 1800 (and the number of subcomponents for those shown in FIG. 18, such as within the CPU complex 1820) may vary from embodiment to embodiment. There may be more or fewer of each component/subcomponent than the number shown in FIG. 18.

Example System

Figure 19:
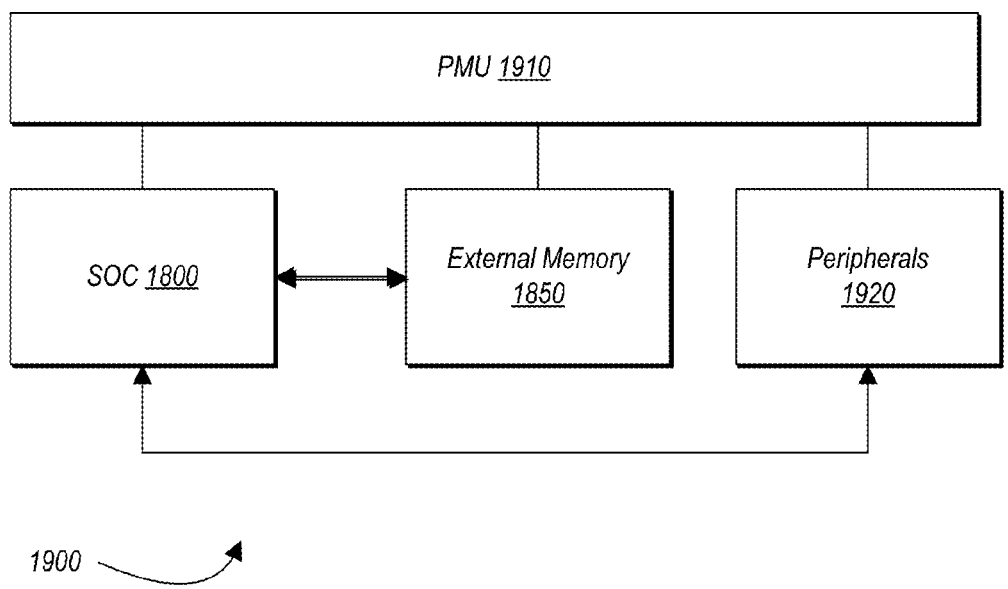
FIG. 19 is a block diagram illustrating one embodiment of a system that includes at least one instance of an SOC.

FIG. 19 a block diagram of one embodiment of a system 1900. In the illustrated embodiment, the system 1900 includes at least one instance of the SOC 1800 coupled to one or more external peripherals 1920 and the external memory 1850. A power management unit (PMU) 1910 is provided which supplies the supply voltages to the SOC 1800 as well as one or more supply voltages to the memory 1850 and/or the peripherals 1920. In some embodiments, more than one instance of the SOC 1800 may be included (and more than one memory 1850 may be included as well).

The peripherals 1920 may include any desired circuitry, depending on the type of system 1900. For example, in one embodiment, the system 1900 may be a mobile device (e.g. personal digital assistant (PDA), smart phone, etc.) and the peripherals 1920 may include devices for various types of wireless communication, such as wifi, Bluetooth, cellular, global positioning system, etc. The peripherals 1920 may also include additional storage, including RAM storage, solid state storage, or disk storage. The peripherals 1920 may include user interface devices such as a display screen, including touch display screens or multitouch display screens, keyboard or other input devices, microphones, speakers, etc. In other embodiments, the system 1900 may be any type of computing system (e.g. desktop personal computer, laptop, workstation, net top etc.).

The external memory 1850 may include any type of memory. For example, the external memory 1850 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 1850 may include one or more memory modules to which the memory devices are mounted, such as single inline memory modules (SIMMs), dual inline memory modules (DIMMs), etc. Alternatively, the external memory 1850 may include one or more memory devices that are mounted on the SOC 1800 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline configured to process blocks of pixels from a video frame; and
a memory;
wherein the block processing pipeline comprises a context-adaptive coding component;
wherein the memory stores a plurality of context model states, each associated with one of a plurality of contexts;
wherein the context-adaptive coding component comprises a cache configured to store context model states associated with one or more of the plurality of contexts;
wherein, for each of a plurality of syntax elements, the context-adaptive coding component is configured to:
determine a context for the syntax element;
obtain a context model state for the context from the memory or from the cache; and
code the syntax element, dependent on the obtained context model state; and
wherein the context-adaptive coding component is further configured to:
store a context model state in the cache, modify a context model state in the cache, or modify an interface of the cache dependent on having coded one or more of the syntax elements.

2. The apparatus of claim 1,
wherein to obtain the context model state, the context-adaptive coding component is configured to:
search the cache for a context model state for the context;
obtain the context model state for the context from the cache in response to locating the context model state for the context in the cache; and
obtain the context model state for the context from the memory in response to failing to locate the context model state for the context in the cache.

3. The apparatus of claim 1, wherein to store a context model state in the cache, the context-adaptive coding component is configured to:
modify a context model state that was obtained from the memory for a context for which no context model state was stored in the cache; and
store the modified context model state in the cache.

4. The apparatus of claim 1, wherein to store a context model state in the cache, the context-adaptive coding component is configured to:
determine a context model state for a context for which no context model state was stored in the cache; and
store the determined context model state in the cache.

5. The apparatus of claim 1,
wherein the obtained context model state comprises a probability value associated with the context; and
wherein to modify a context model state in the cache, the context-adaptive coding component is configured to increase the probability value associated with the context or decrease the probability value associated with the context.

6. The apparatus of claim 1,
wherein the context-adaptive coding component is further configured to monitor the frequency or number of accesses targeting at least some of the plurality of context model states stored in the memory; and
wherein the context-adaptive coding component is configured to store a context model state for a given context in the cache in response to determining that a context model state for the given context has been accessed more frequently or more times than context model states for other ones of the plurality of contexts.

7. The apparatus of claim 1, wherein to modify an interface of the cache, the context-adaptive coding component is configured to modify an index used to access at least some of the context model states stored in the memory or in the cache.

8. The apparatus of claim 1, wherein to modify an interface of the cache, the context-adaptive coding component is configured to modify a mapping between at least some of the context model states stored in the memory and the locations at which they are stored in the memory or in the cache.

9. The apparatus of claim 1, wherein the context-adaptive coding component is further configured to:
monitor the number or frequency of accesses targeting at least some of the plurality of context model states stored in the memory;
detect a pattern in the accesses that suggests a benefit in modifying an interface of the cache; and
modify an interface of the cache in response to detecting the access pattern.

10. The apparatus of claim 1, wherein, subsequent to storing a context model state in the cache or modifying a context model state in the cache, the context-adaptive coding component is further configured to store the content model state that was stored or modified in the cache in the memory.

11. A method, comprising:
storing a plurality of probability values associated with a plurality of video encoding contexts in a lookup table in an external memory;
storing one or more probability values in a local buffer, each of which is associated with one of the plurality of video encoding contexts;
receiving a plurality of syntax elements representing blocks of pixels from a video frame;
encoding one or more of the syntax elements, wherein said encoding comprises, for each of the syntax elements, accessing a probability value for a current video encoding context in the lookup table or in the local buffer;
detecting a pattern in accesses targeting at least some of the plurality of probability values stored in the external memory that suggests a modification of an indexing of local buffer entries, a modification of an indexing of entries in the lookup table, or a modification of a mapping between local buffer entries and entries in the lookup table;
in response to said detecting, performing the suggested modification.

12. The method of claim 11,
wherein the method further comprises, prior to said encoding, attempting to locate the probability value for the current video encoding in the local buffer; and
accessing the probability value for the current video encoding in the lookup table in response to failing to locate the probability value for the current video encoding in the local buffer.

13. The method of claim 11, further comprising, for each of the one or more syntax elements and prior to said encoding, determining the current video encoding context dependent, at least in part, on neighbor data for the syntax element.

14. The method of claim 11, further comprising:
for each of the one or more syntax elements:
subsequent to said encoding:
modifying a probability value for the current video encoding context dependent on results of said encoding; and
storing the modified probability value for the current video encoding context in the lookup table or in the local buffer.

15. The method of claim 14, wherein said modifying comprises increasing the probability value for the current video encoding context or decreasing the probability value for the current video encoding context.

16. A device, comprising:
a memory configured to store a plurality of context model states for a plurality of video encoding contexts in a lookup table; and
an apparatus configured to process video frames, the apparatus comprising:
a block processing pipeline comprising a plurality of processing units and a cache, each processing unit configured to perform one or more operations on a block of pixels passing through the pipeline;
wherein the block processing pipeline is configured to:
receive a plurality of binarized syntax elements representing blocks of pixels from one or more video frames;
encode each of the plurality of binarized syntax elements using context-adaptive coding, wherein to encode each of the binarized syntax elements, the block processing pipeline is configured to:
determine a video encoding context for use in encoding the binarized syntax element;
access a context model state for the determined video encoding context from the lookup table or from the cache;
encode the binarized syntax element; and
store a current context model state for the determined video encoding context in the cache, wherein the current context model state is dependent on a result of the encoding.

17. The device of claim 16, wherein to encode each of the plurality of binarized syntax elements using context-adaptive coding, the block processing pipeline is configured to encode each of the plurality of binarized syntax elements using context-adaptive binary arithmetic coding.

18. The device of claim 16, wherein the context model state comprises one or more of: an index value that represents a least probable symbol probability or a value of a most probable symbol.

19. The device of claim 18, wherein to store the current context model state for the determined video encoding context in the cache, the block processing pipeline is configured to increase the least probable symbol probability or decrease the least probable symbol probability, dependent on whether or not the result of the encoding was equal to the value of the most probable symbol.

20. The device of claim 16, wherein the block processing pipeline is further configured to:
track the number or frequency of accesses targeting at least some of the plurality of context model states stored in the lookup table;
detect that context model states for a group of two or more of the plurality of video encoding contexts are repeatedly accessed in sequence; and
modify a mapping of video encoding contexts and lookup table locations such that the context model states for the group of video encoding contexts are collectively cached in response to a context model state for one of the video encoding contexts in the group being accessed.

* * * * *